(12) United States Patent
Hacko et al.

(10) Patent No.: US 9,045,253 B2
(45) Date of Patent: Jun. 2, 2015

(54) PALLET-DOLLY

(75) Inventors: Haron Hacko, Kfar Kama (IL); Nir Hadar, Shafayim (IL)

(73) Assignee: Polymer Logistics (Israel) Ltd., Hod HaSharon (IL)

( * ) Notice: Subject to any disclaimer, the term of this patent is extended or adjusted under 35 U.S.C. 154(b) by 673 days.

(21) Appl. No.: 13/296,272

(22) Filed: Nov. 15, 2011

(65) Prior Publication Data

US 2013/0121800 A1    May 16, 2013

(51) Int. Cl.
  *B65D 19/42*  (2006.01)
  *B65D 19/00*  (2006.01)
  *B62B 5/04*   (2006.01)
  *B62B 5/00*   (2006.01)

(52) U.S. Cl.
  CPC .......... *B65D 19/0026* (2013.01); *B62B 5/0433* (2013.01); *B62B 5/049* (2013.01); *B65D 19/42* (2013.01); *B65D 2519/00034* (2013.01); *B65D 2519/00069* (2013.01); *B65D 2519/00273* (2013.01); *B65D 2519/00288* (2013.01); *B65D 2519/00323* (2013.01); *B65D 2519/00333* (2013.01); *B65D 2519/00407* (2013.01); *B65D 2519/00412* (2013.01); *B65D 2519/00572* (2013.01); *B65D 2519/00781* (2013.01); *B62B 5/0093* (2013.01)

(58) Field of Classification Search
  USPC ......... 280/30, 43, 43.12, 43.14, 79.11, 43.24; 108/56.3, 57.15
  See application file for complete search history.

(56) References Cited

U.S. PATENT DOCUMENTS

| 1,063,620 | A | * | 6/1913 | Thornley | 482/25 |
| 1,129,775 | A |   | 2/1915 | Anthony |  |
| 1,355,173 | A | * | 10/1920 | Shadel et al. | 296/13 |
| 2,379,476 | A | * | 7/1945 | Cleveland, Jr. | 280/43.15 |
| 2,511,073 | A | * | 6/1950 | McCandless | 254/10 C |
| 2,537,909 | A | * | 1/1951 | Puddester | 188/5 |
| 2,783,055 | A | * | 2/1957 | Michaud | 280/43.14 |
| 2,812,189 | A | * | 11/1957 | Geldhof | 280/43.14 |
| 2,843,392 | A | * | 7/1958 | Simpkins | 280/43.14 |
| 2,879,865 | A | * | 3/1959 | Simmons | 188/69 |
| 3,054,623 | A | * | 9/1962 | Simpkins | 280/43.14 |
| 3,216,531 | A | * | 11/1965 | Hutchinson | 188/5 |
| 3,356,185 | A | * | 12/1967 | Isaacks | 188/31 |
| 3,422,929 | A | * | 1/1969 | Oja et al. | 188/5 |
| 3,710,895 | A | * | 1/1973 | Freedman | 188/5 |
| 4,016,819 | A |   | 4/1977 | Cowling |  |

(Continued)

FOREIGN PATENT DOCUMENTS

| DE | 2032214 | 2/1972 |
| DE | 2364909 | 7/1975 |

(Continued)

*Primary Examiner* — Brodie Follman
(74) *Attorney, Agent, or Firm* — Mark M. Friedman

(57) ABSTRACT

A pallet-dolly device convertible between a pallet and a dolly has a deck to which a set of dolly wheels are attached at a fixed height below the deck. A set of movable pallet skids are mechanically interlinked with the deck by a bistable skid displacement mechanism which assumes a first state biasing the pallet skids upwards towards a skid raised position and a second state in which the bistable skid displacement mechanism biases the pallet skids downwards towards a skid lowered position. Also described are embodiments allowing conversion from dolly to pallet by directly pressing downwards on a skid, and provision of a braked-dolly state through downward pressure of the skid against the ground and/or a skid-actuated wheel brake.

27 Claims, 12 Drawing Sheets

(56) References Cited

U.S. PATENT DOCUMENTS

| | | | |
|---|---|---|---|
| 4,073,369 A * | 2/1978 | Nordskog | 188/5 |
| 4,213,624 A * | 7/1980 | Sanders | 280/43.12 |
| 4,313,612 A | 2/1982 | Rubens | |
| 4,417,738 A * | 11/1983 | Kendall | 280/43.17 |
| 4,471,969 A | 9/1984 | Zabala | |
| 4,753,419 A | 6/1988 | Johansson | |
| 4,874,182 A * | 10/1989 | Clark | 280/30 |
| 4,886,286 A | 12/1989 | Whorton | |
| 4,902,026 A * | 2/1990 | Maldonado | 280/30 |
| 5,113,960 A | 5/1992 | Prinz | |
| 5,193,828 A | 3/1993 | Benvenuti | |
| 5,257,794 A * | 11/1993 | Nakamura | 280/79.3 |
| 5,514,118 A | 5/1996 | Kummer | |
| 5,551,715 A * | 9/1996 | Pickard | 280/43.24 |
| 5,584,639 A | 12/1996 | Walker, Jr. | |
| 5,628,522 A * | 5/1997 | Hall | 280/43.17 |
| 5,752,584 A | 5/1998 | Magoto et al. | |
| 5,819,671 A | 10/1998 | Ocampo | |
| 5,829,947 A | 11/1998 | Litten | |
| 5,845,914 A | 12/1998 | Lenkman | |
| 5,890,562 A | 4/1999 | Bartels et al. | |
| 5,890,695 A * | 4/1999 | Brewer, III | 248/638 |
| 5,938,217 A | 8/1999 | Wintz | |
| 6,120,045 A * | 9/2000 | Rosko | 280/87.051 |
| 6,179,087 B1 * | 1/2001 | Moffat | 182/15 |
| 6,286,630 B1 * | 9/2001 | Obergfell | 188/19 |
| 6,390,759 B1 | 5/2002 | Novak et al. | |
| 6,450,515 B1 | 9/2002 | Guth | |
| 6,860,496 B2 | 3/2005 | Novak et al. | |
| 7,165,776 B2 | 1/2007 | Quinlan et al. | |
| 7,537,222 B2 * | 5/2009 | Hadar | 280/43.12 |
| 7,891,675 B2 * | 2/2011 | Dobra et al. | 280/43.12 |
| 8,006,985 B2 * | 8/2011 | Facey et al. | 280/43.14 |
| 8,016,300 B2 * | 9/2011 | Cramer et al. | 280/43.14 |
| 8,246,059 B2 * | 8/2012 | Gass et al. | 280/43.14 |
| 8,292,309 B2 * | 10/2012 | Fan et al. | 280/43.14 |
| 8,403,344 B2 * | 3/2013 | Carver et al. | 280/79.11 |
| 8,511,693 B2 * | 8/2013 | Gass et al. | 280/43.17 |
| 8,657,246 B2 * | 2/2014 | Ma | 248/346.01 |
| 8,752,489 B2 * | 6/2014 | Linares | 108/53.1 |
| 8,833,709 B2 * | 9/2014 | Weng | 248/129 |
| 8,851,093 B2 * | 10/2014 | Li | 135/16 |
| 2003/0213878 A1 | 11/2003 | Stahl | |
| 2005/0002766 A1 | 1/2005 | Hartmann | |
| 2007/0186827 A1 * | 8/2007 | Loftus et al. | 108/57.15 |
| 2008/0056871 A1 * | 3/2008 | Morgan et al. | 414/495 |
| 2008/0296463 A1 * | 12/2008 | Li | 248/519 |
| 2009/0224133 A1 * | 9/2009 | Gass et al. | 248/651 |
| 2009/0236809 A1 * | 9/2009 | Carver et al. | 280/43.12 |
| 2010/0147341 A1 * | 6/2010 | Li | 135/16 |
| 2010/0187782 A1 * | 7/2010 | Facey et al. | 280/30 |
| 2012/0024329 A1 * | 2/2012 | Ma | 135/16 |
| 2013/0119623 A1 * | 5/2013 | Sadeh et al. | 280/30 |
| 2013/0121800 A1 * | 5/2013 | Hacko et al. | 414/800 |

FOREIGN PATENT DOCUMENTS

| | | |
|---|---|---|
| DE | 2432111 | 1/1976 |
| DE | 7526812 | 1/1976 |
| DE | 19809331 | 5/1999 |
| EP | 0487147 | 5/1992 |
| EP | 0666209 | 8/1995 |
| EP | 1176079 | 1/2002 |
| EP | 1362794 | 11/2003 |
| EP | 1524170 | 4/2005 |
| EP | 2103491 | 9/2009 |
| FR | 1391000 | 1/1965 |
| GB | 1232144 | 5/1971 |
| GB | 1498022 | 1/1978 |
| JP | 2000238777 | 9/2000 |
| WO | 2004080780 | 9/2004 |
| WO | 2005080214 | 9/2005 |
| WO | 2007028194 | 3/2007 |
| ZA | 8902552 | 12/1989 |

* cited by examiner

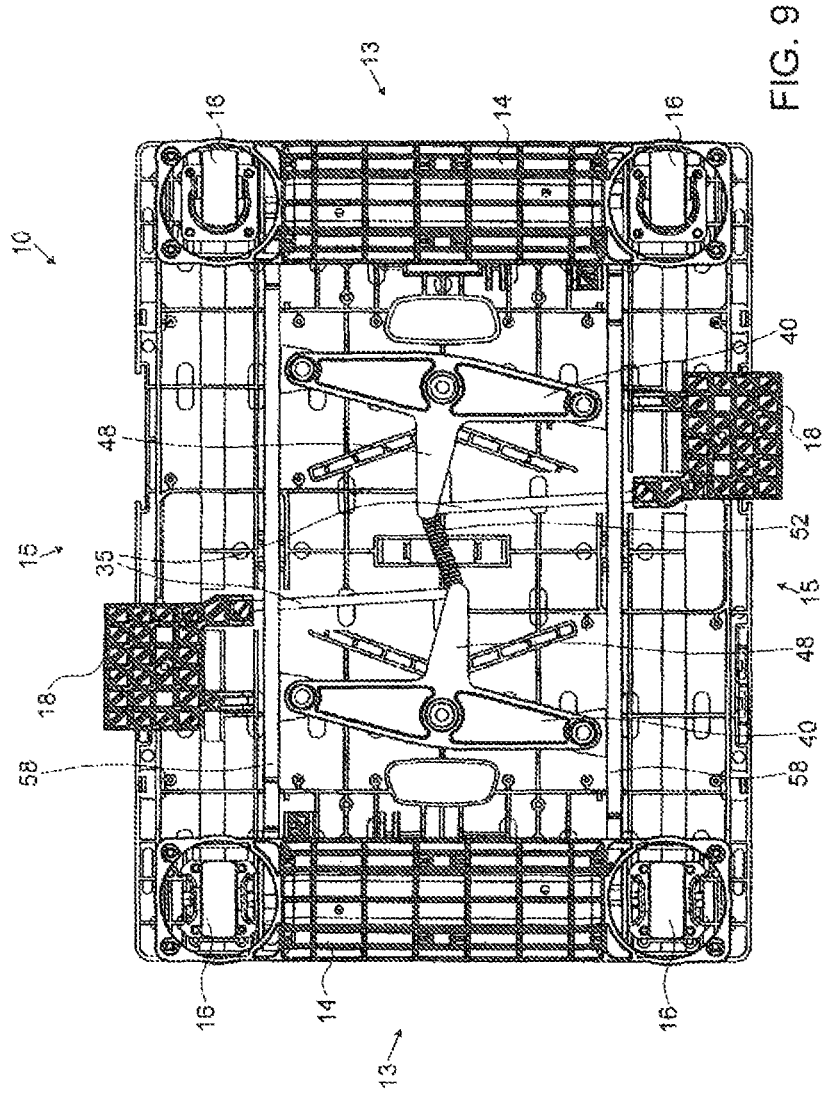
FIG. 9
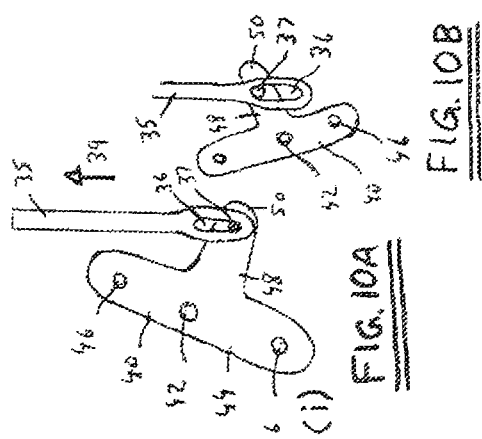
FIG. 10A
FIG. 10B

PALLET-DOLLY

BACKGROUND

1. Technical Field

Embodiments of the present invention relate generally to moving equipment and, more particularly, but not exclusively, to a movable platform that can be configured as a pallet or a dolly.

2. Description of Related Art

Pallets and dollies are in extensive use worldwide to facilitate the movement of goods. Both pallets and dollies may be described as low to the ground, portable platforms on which goods may be stacked for storage or moving. The two devices are distinguished primarily by their type of undersurface or ground contact. Pallets have a fixed, non-rolling bottom surface, whereas dollies have wheels, with or without brakes.

A common type of pallet bottom surface is a skid, which is a continuous plank that provides support along its whole length. Pallets generally also include open ends configured to receive the forks of a manual pallet jack, motorized forklift truck, or other lifting device, so that the palletized load can be raised and moved about easily.

Pallets are particularly suitable for storing goods, such as in a racking arrangement, at a warehouse, moving goods on conveyor belts and roll conveyors, and for transporting goods between distant locations, where the pallets are loaded onto shipping containers, trucks, railway cars, and other vehicles. Dollies are better suited for the internal movement of goods within a given location where pallet moving equipment such as manual pallet jacks or forklift trucks would be unwieldy or costly. For example, unloading a shipment of goods at a supermarket is often more efficiently accomplished by having the stocking clerk wheel a dolly holding the goods to the appropriate display section of the store, rather than through use of a forklift.

In order to achieve efficient shipping and distribution of goods, it is often desirable to transfer the goods from one device to another, and in particular from a pallet to a dolly. However, physically removing goods from one movable platform and re-loading them on another is inefficient and time consuming. As a result, attempts have been made to create movable platforms that can function as both pallets and dollies, where the user can switch the platform functionality as needed. As a pallet, the undersurface would be one or more skids, and as a dolly, the undersurface would be wheels. An example of such a combination device is U.S. Pat. No. 7,537,222 to Hadar. This patent shows a device in which dolly wheels are placed at a fixed height relative to the load bearing deck, and various displacement mechanisms are used to extend or retract pallet skids as appropriate.

BRIEF SUMMARY

According to an aspect of the present invention, there is provided a pallet-dolly device convertible between a pallet and a dolly, the device comprising:

a deck having a load supporting surface;

a set of dolly wheels, attached at a fixed height below an underside of the deck so as to define a wheel contact plane;

a set of movable pallet skids, each pallet skid having a ground contacting surface; and a bistable skid displacement mechanism mechanically interlinking the deck and the pallet skids, the bistable skid displacement mechanism being configured to assume a first state biasing the pallet skids upwards towards a skid raised position in which the skid ground contacting surface is raised above the wheel contact plane to provide a dolly state of the pallet-dolly device, and the bistable skid displacement mechanism being further configured to assume a second state in which the bistable skid displacement mechanism biases the pallet skids downwards towards a skid lowered position in which the skid ground contacting surface is lowered below the wheel contact plane to provide a pallet state of the pallet-dolly device.

According to another aspect of the present invention, there is provided a pallet-dolly device convertible between a pallet and a dolly, the device comprising:

a deck having a load supporting surface;

a set of dolly wheels, attached at a fixed height below an underside of the deck so as to define a wheel contact plane;

a set of movable pallet skids, each pallet skid having a ground contacting surface; and a skid displacement mechanism mechanically interlinking the deck and the pallet skids, the skid displacement mechanism being configured to assume a first state biasing the pallet skids upwards towards a skid raised position in which the skid ground contacting surface is raised above the wheel contact plane to provide a dolly state of the pallet-dolly device, and wherein downward force applied directly to one of the pallet skids is effective to displace the pallet skids downwards towards a skid lowered position in which the skid ground contacting surface is lowered below the wheel contact plane to provide a pallet state of the pallet-dolly device.

According to yet another aspect of the present invention, there is provided a pallet-dolly device convertible between a pallet and a dolly, the device comprising:

a deck having a load supporting surface;

a set of dolly wheels, attached at a fixed height below an underside of the deck so as to define a wheel contact plane;

a set of movable pallet skids, each pallet skid having a ground contacting surface; and a skid displacement mechanism mechanically interlinking the deck and the pallet skids, the skid displacement mechanism being configured to assume a first state in which the pallet skids are retained in a skid raised position in which the skid ground contacting surface is raised above the wheel contact plane to provide a dolly state of the pallet-dolly device, the skid displacement mechanism being further configured to assume a second state in which the skid displacement mechanism biases the pallet skids downwards towards a skid lowered position in which the ground contacting surface is lowered below the wheel contact plane to provide a pallet state of the pallet-dolly device, wherein the skid displacement mechanism is further configured such that, when a load is supported on the deck and the ground contacting surface is brought level with the wheel contact plane, the second state generates a downward contact force of the ground contacting surfaces against an underlying surface, thereby acting as a brake.

According to yet another aspect of the present invention, there is provided a method of moving a load of goods using a pallet-dolly device, the method comprising:

configuring the pallet-dolly as a pallet;

loading the goods onto a deck of the pallet-dolly;

transporting the loaded pallet-dolly from a source location to a target location;

pressing a pedal on the pallet-dolly to convert the pallet-dolly to a dolly at the target location;

unloading the goods from the pallet-dolly at the target location; and pressing a skid on the pallet-dolly to convert the pallet-dolly to a state selected from the group consisting of: a pallet; and a braked dolly in which the skid is biased downwards against an underlying surface to act as a brake.

There is also provided according to an embodiment of the present invention, a pallet-dolly device convertible between a pallet and a dolly, the device comprising: a deck having a load supporting surface; a set of dolly wheels, attached at a fixed height below an underside of the deck so as to define a wheel contact plane; a set of movable pallet skids, each pallet skid having a ground contacting surface, the pallet skids between displaceable between a skid raised position in which the skid ground contacting surface is raised above the wheel contact plane to provide a dolly state of the pallet-dolly device and a skid lowered position in which the skid ground contacting surface is lowered below the wheel contact plane to provide a pallet state of the pallet-dolly device; and at least one wheel brake engageable with an associated wheel of the set of dolly wheels, the wheel brake being configured to assume a released state in which the wheel is free to turn and an engaged state in which the wheel brake prevents rotation of the wheel, wherein the wheel brake is mechanically associated with a corresponding one of the pallet skids such that displacement of the pallet skids downwards results in transfer of the wheel brake from the released state to the engaged state so as to prevent rotation of the associated wheel.

According to a further feature of an embodiment of the present invention, the wheel brake comprises a brake pin selectively deployable between a disengaged state corresponding to the released state of the wheel brake and a positively engaged state in which the brake pin engages a corresponding recess formed on an engagement surface of the wheel to define the engaged state of the wheel brake.

According to a further feature of an embodiment of the present invention, the brake pin is resiliently biased to the disengaged state, and wherein the wheel brake is mechanically associated with the pallet skid such that downward displacement of the pallet skid displaces the brake pin towards the positively engaged state.

According to a further feature of an alternative embodiment of the present invention, the brake pin is resiliently biased to the positively engaged state, and wherein the wheel brake is mechanically associated with the pallet skid such that upward displacement of the pallet skid displaces the brake pin towards the disengaged state.

BRIEF DESCRIPTION OF THE DRAWINGS

The present invention will be further understood and appreciated from the following detailed description taken in conjunction with the drawings in which:

FIG. 9 is a bottom view of the pallet-dolly of FIG. 8A;

FIGS. 10A and 10B are schematic illustrations of side pedal rods and cross connectors of the pallet-dolly of FIGS. 8A and 8B, respectively;

DETAILED DESCRIPTION

Figure 1A:
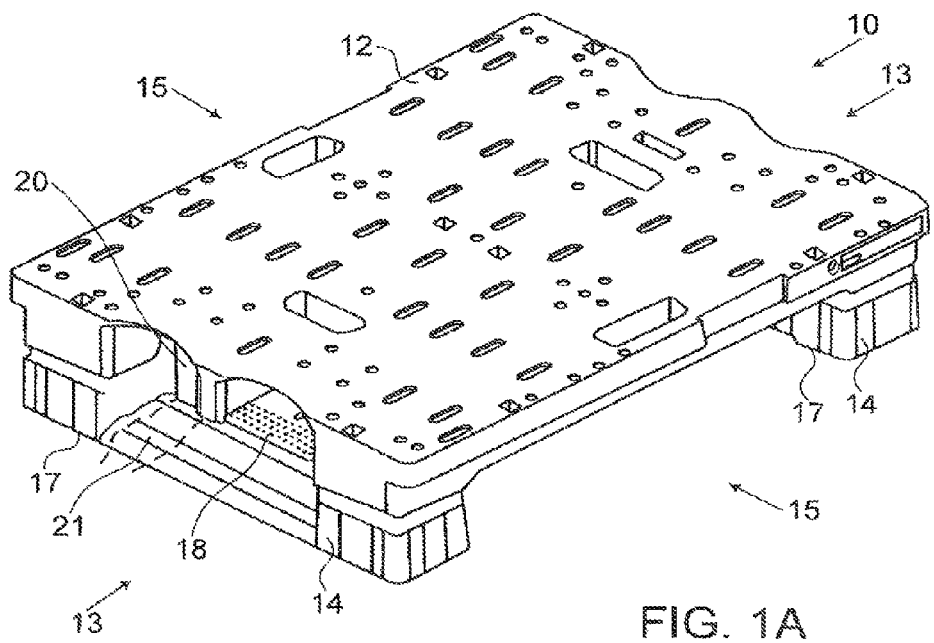
FIG. 1A is a perspective view of a pallet-dolly consistent with an embodiment of the present invention, where the pallet-dolly is configured as a pallet.

Reference will now be made in detail to embodiments of the present invention, examples of which are illustrated in the accompanying drawings, wherein like reference numerals refer to the like elements throughout. The embodiments are described below to explain the present invention by referring to the figures.

Figure 1B:
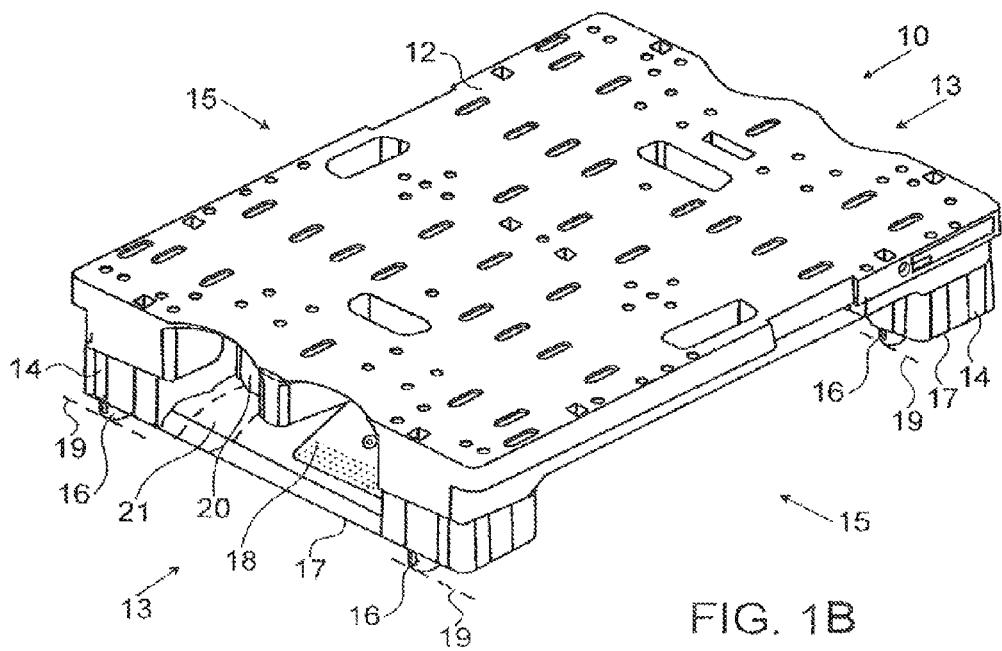
FIG. 1B is a perspective view of the pallet-dolly of FIG. 1A, where the pallet-dolly is configured as a dolly.

Referring now to FIGS. 1A and 1B, there is shown a perspective view of a pallet-dolly 10 consistent with an embodiment of the present invention. Pallet-dolly 10 is a movable platform or device used to carry a load, such as goods in commerce, for shipping or storage. As indicated, pallet-dolly 10 includes a deck 12 to support the load, a set of skids 14, and a set of wheels 16. Skids 14 include a bottom or ground contacting surface or edge 17. As indicated, pallet-dolly 10 is generally rectangular, having two short sides 13 and two long sides 15.

Pallet-dolly 10 is configured to be convertible between a pallet and a dolly. FIG. 1A shows device 10 configured as a pallet, in which a bottom surface of the device is the set of skids 14, or more particularly, skid bottom edge 17. FIG. 1B shows device 10 configured as a dolly, in which the bottom surface is the set of wheels 16. When configured as a pallet, pallet-dolly 10 generally requires pallet handling equipment such as a manual or motorized forklift to be moved by a user. When configured as a dolly, wheels 16 enable a user to move pallet-dolly 10, in most cases, simply by manually pushing or pulling on a part of pallet-dolly 10 or on the load supported by deck 12, or by use of a removable handle (not shown) configured for engaging corresponding features of the pallet-dolly.

As will be discussed in greater detail below, skids 14 are movable between a lowered position and a raised position. In FIG. 1A skids 14 are in the lowered position. In this position skid bottom edges 17 are below or lower than a wheel contact plane 19 defined by the bottoms of wheels 16 (shown in FIG.

2A), so that skids 14 make contact with the ground and device 10 is configured as a pallet. In FIG. 1B skids 14 are in the raised position, in which skid bottom edges 17 are above wheel contact plane 19. Accordingly in this case wheels 16 contact the ground, and device 10 is configured as a dolly.

Pallet-dolly 10 typically includes at least one pedal 18. As indicated, pedal 18 is accessible to the user on a side of device 10, in this case short side 13. As will be described in greater detail below, when pressed by the user, pedal 18 assists in converting pallet-dolly 10 from the pallet state to the dolly state.

According to certain particularly preferred embodiments of the present invention, pallet-dolly 10 is configured such that a user converts the pallet-dolly from the dolly state to the pallet state simply by pressing directly on skid 14. Most preferably, a skid displacement mechanism (described below) ensures simultaneous movement of all the skids, such that foot-actuated downward displacement of one skid simultaneously lowers all of the skids. As shown in the figures, adjacent to and/or below pedal 18 is an open space 20 above skid 14. Space 20 is empty in that it does not contain a pedal 18 or any other element. Accordingly, a user may insert a foot into this space and press down directly onto skid 14. A dashed area 21 is shown on skid 14 in FIGS. 1A and 1B to indicate a part of skid 14, directly below part of open space 20, that is suitable for receiving the user's foot.

A further feature of certain preferred embodiments of pallet-dolly 10 is that the depressable skid 14 also serves as a user operable brake, assuming a state in which it is biased downwards so as to press against the underlying surface when lowered to around wheel contact plane 19.

The above features of a preferred embodiment of pallet-dolly 10 may be clarified through review of a cycle of conversion between states as experienced by the user. Beginning with pallet-dolly 10 as a pallet as shown in FIG. 1A, as noted skids 14 are in the skid lowered position. In order to convert the device from this state to a dolly, the user presses pedal 18 from its default position, substantially parallel to the floor. When pedal 18 moves down, skids 14 move up, typically simultaneously, from the skid lowered position to the skid raised position, so that skid bottom edges 17 are above wheel contact plane 19, as shown in FIG. 1B. Pedal 18 is preferably spring-biased to return to its generally horizontal position.

In order to apply the brake and/or convert the device back to the pallet state, the user inserts his or her foot into open space 20 and presses down on skid 14. This action urges the skid to move from the skid raised position of FIG. 1B towards the skid lowered position of FIG. 1A. More particularly, pressing down on skid 14 moves the skid so that skid bottom edge 17 is in contact with the ground to provide a brake, but does not necessarily move wheels 16 off the ground, particularly if deck 12 is loaded. When pallet-dolly 10 is lifted clear of the ground, or in some cases simply unloaded, skid 14 moves beyond the brake position to reach its fully lowered and locked position as a pallet. Whether in the brake position or the pallet state, the user can convert the device back to a dolly at any time by pressing pedal 18.

Figure 2A:
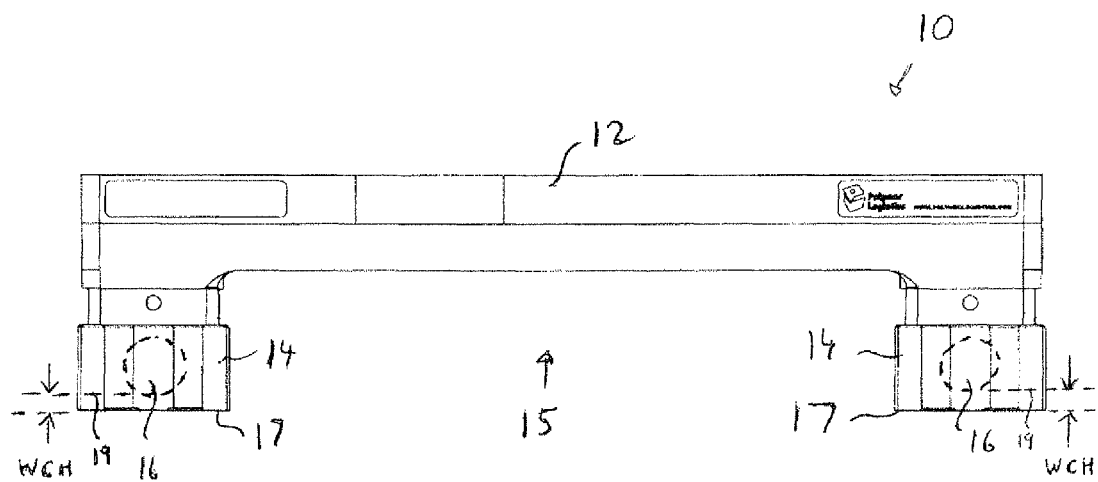
FIG. 2A is a long side view of the pallet-dolly of FIG. 1A, where the pallet-dolly is configured as a pallet.
Figure 2B:
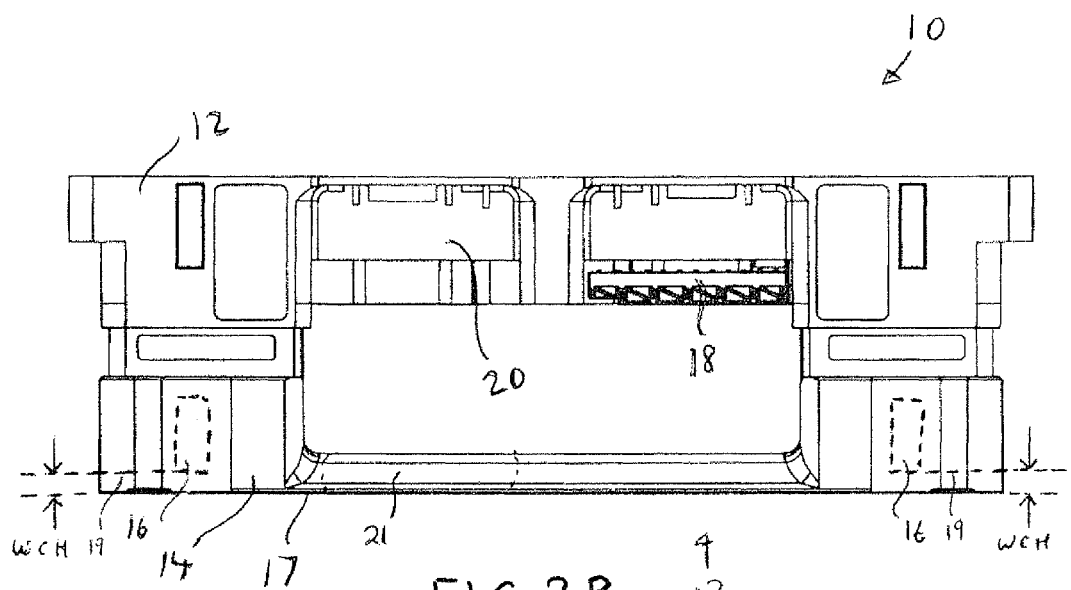
FIG. 2B is a short side view of the pallet-dolly of FIG. 1A, where the pallet-dolly is configured as a pallet.
Figure 3A:
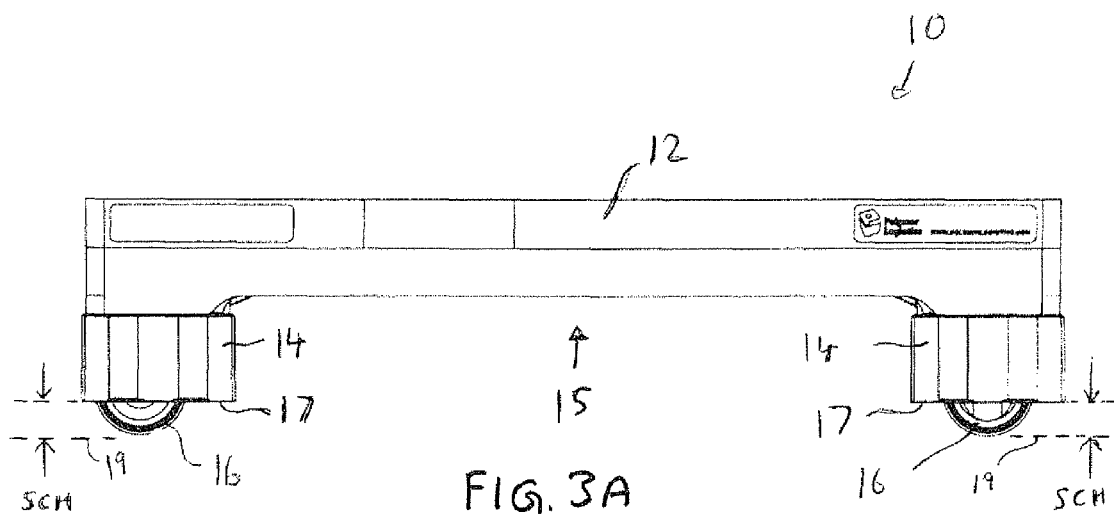
FIG. 3A is a long side view of the pallet-dolly of FIG. 1B, where the pallet-dolly is configured as a dolly.
Figure 3B:
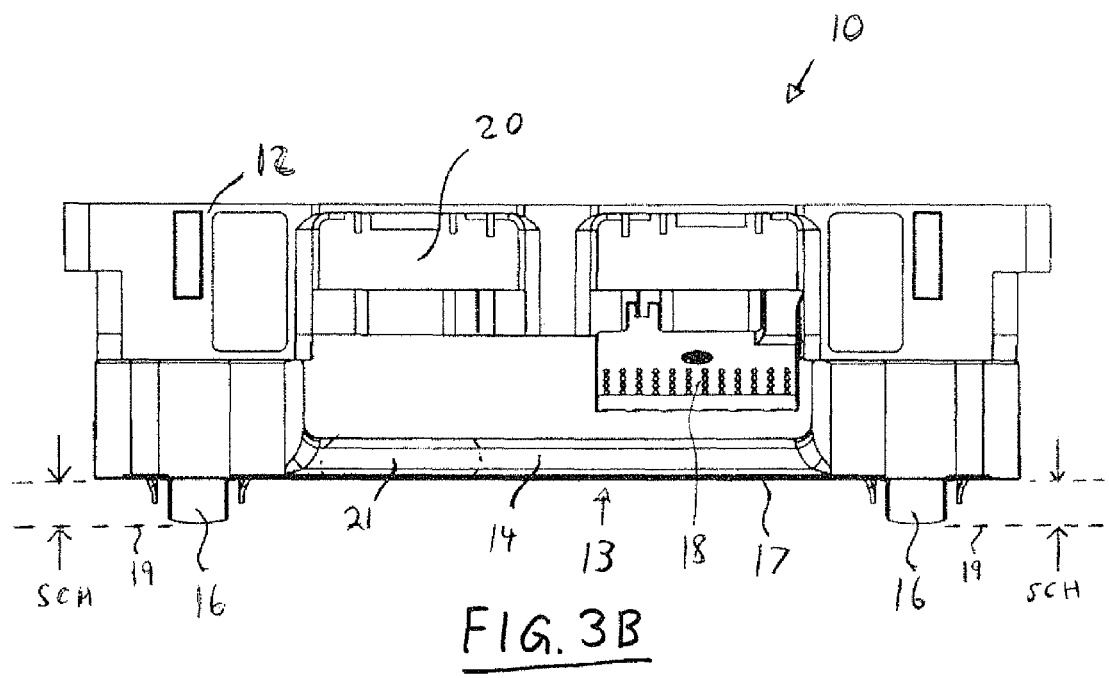
FIG. 3B is a short side view of the pallet-dolly of FIG. 1B, where the pallet-dolly is configured as a dolly.
Figure 4A:
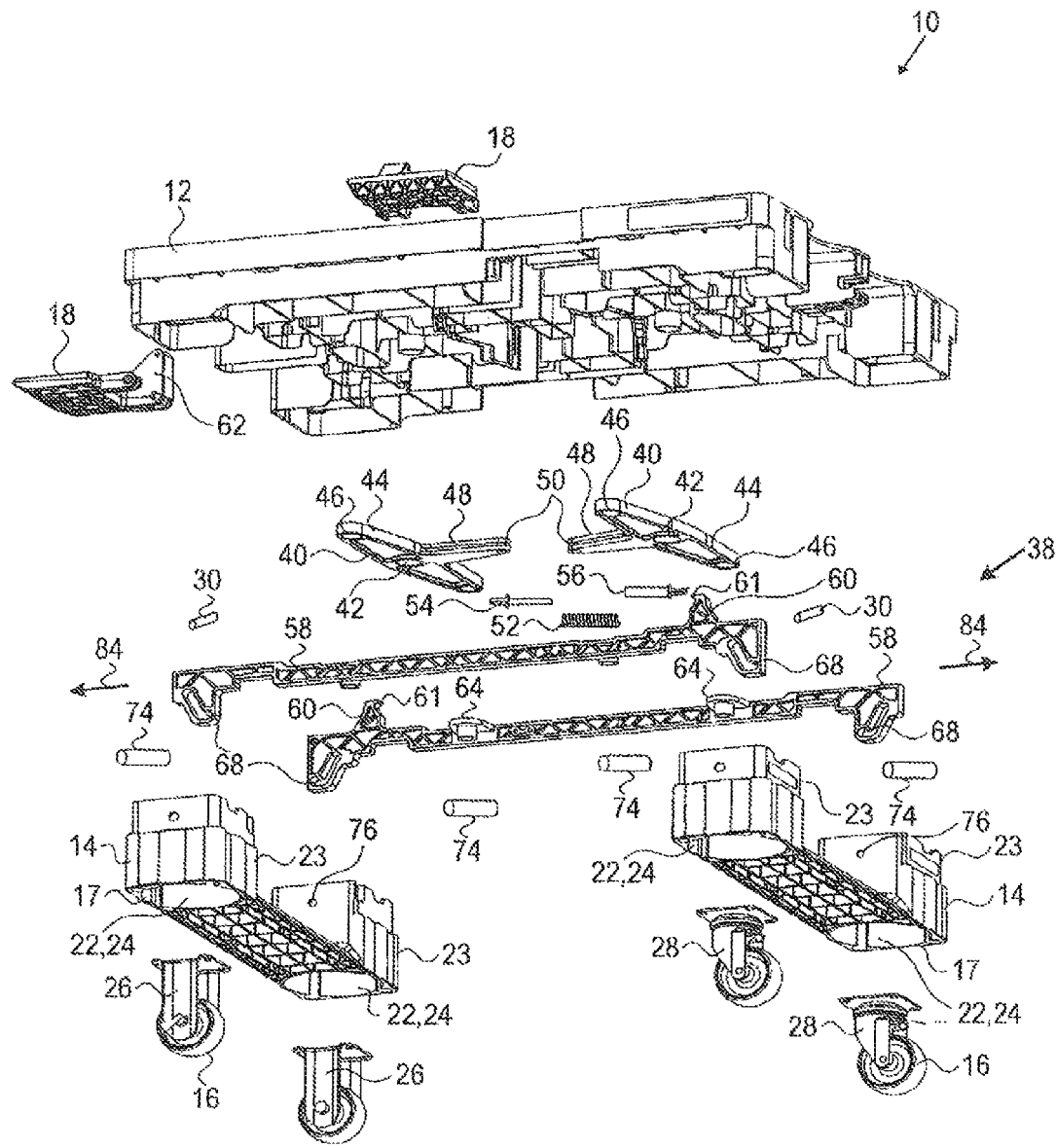
FIG. 4A is an exploded view of the elements of the pallet-dolly of FIGS. 1A-B.
Figure 4B:
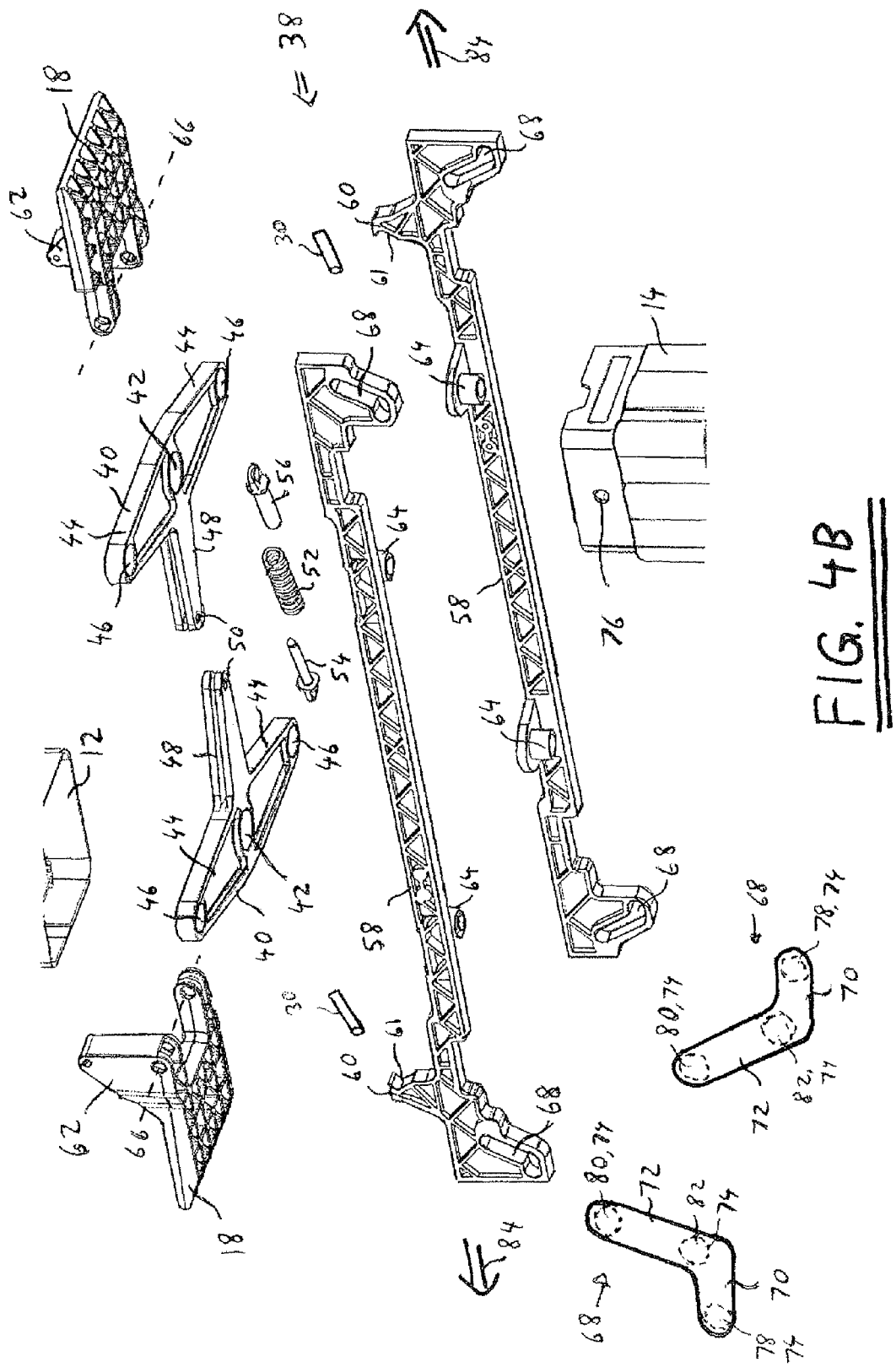
FIG. 4B is an enlarged view of some of the elements of the pallet-dolly shown in the view of FIG. 4A.

Additional views of pallet-dolly 10 are provided in FIGS. 2A-B, 3A-B, 4A, and 4B. FIGS. 2A and 2b provide side views along long side 15 and short side 13, respectively, when the device is configured as a pallet as shown in FIG. 1A. Similarly, FIGS. 3A and 3B provide long and short side views, respectively, when device 10 is configured as a dolly, as shown in FIG. 1B. FIGS. 4A and 4B show the elements of pallet-dolly 10 in an exploded view.

Deck 12 has an overall shape that is generally rectangular, having two short sides 13 and two long sides 15. According to some embodiments deck 12 may be square, with four sides of equal length. The sides are substantially straight and uninterrupted, but may include rounded corners, localized recesses, or other breaks or discontinuities from a straight line, for example, as shown in the device of FIGS. 1A and 1B. Deck 12 is preferably made of strong plastic, but may be made from any other material that is rigid and sufficiently strong to support the type of load to be carried by pallet-dolly 10, such as metal or wood, for example. The underside of deck 12 which comes in contact with the forks of a forklift also usually includes a layer of rubber or rubber strips, so that pallet-dolly 10 does not slip off the forklift while being lifted.

Skids 14 are functionally continuous planks that provide support along their length, so that they can be moved on a roller conveyor or the like. The set of skids 14 generally comprises two skids at opposing ends of dolly-pallet 10. Skids 14 are preferably located at the ends of dolly-pallet 10 corresponding to short sides 13, and accordingly have a length that is substantially the same as short sides 13. According to some embodiments of the invention, skids 14 may alternatively be located at opposing long sides 15, and have a length substantially the same as long sides 15. In certain implementations, one or more intermediate skid may be provided across a dimension of the device to provide a 3-skid pallet or multi-skid pallet. In the example of FIGS. 1A-B, two skids 14 are located adjacent to short sides 13.

Skids 14 may be made from any material that is durable and strong, and are most conveniently made of the same material used for deck 12. The underside of skids 14, which comes in contact with an underlying surface such as a floor, is also typically covered in a layer of rubber, rubber strips, or features rubber inserts in some other configuration. The rubber surface has the benefit of reducing slippage generally, and also enhances the frictional braking force when pallet-dolly 10 is configured as a brake.

As shown in greater detail in FIG. 4A, skids 14 also include wheel openings 22 at opposing ends to accommodate wheels 16. Each wheel opening 22 is surrounded by an upwardly projecting wall 23 based at a top surface of skid 14, so as to form a hollow wheel chamber 24. The set of wheels 16 are fixedly attached to an underside of deck 12 such that each wheel 16 is positioned inside one of the hollow wheel chambers 24. The wheels 16 are positioned substantially in the center of each chamber 24, so that they are free to rotate and/or swivel as appropriate.

The set of wheels 16 generally comprises four wheels, one at each corner of device 10. According to some embodiments, set of wheels 16 may comprise four groups of wheels, where each group consists of two or more wheels placed at each corner of the device. Embodiments of this type may be useful to support loads that are particularly heavy. Wheels 16 may be fixed in orientation so that they can only roll in one direction, such as along a line parallel to long sides 15. Alternatively, wheels 16 may be configured to swivel or rotate, usually over a full 360 degree range. Wheels that swivel provide greater maneuverability, but also swerve more and are more difficult to control and move in a straight line. For this reason, some embodiments of device 10 combine the two wheel types, using a pair of fixed orientation wheels at one end and a pair of swivel wheels at the other end. In the view of FIG. 4A, it can also be seen that a pair of wheels 16 located at one short side 13 of deck 12 are the fixed type, since they are held in fixed wheel frames 26, and the pair of wheels located at the other short side 13 are the swivel or caster type, since they are held in swivel wheel frames 28.

The set of wheels 16 are fixed in position with respect to deck 12, including maintaining a fixed distance from deck 12.

By contrast, skids 14 vary in distance from deck 12, as skids 14 move between the raised and lowered position.

According to some embodiments, a hand activated device such as a manual lever or handle may be used instead of pedal 18. Such a lever may optionally be combined with the function of an external handle for moving device 10 when configured as a dolly. Foot activated pedals however are generally preferred in that they can be easily activated by a standing user without bending down and without requiring additional external equipment.

Pallet-dolly 10 may have pedals 18 on any number of sides of deck 12. Since both pedal 18 and skid 14 will be pressed by the user in the course of operation of the device, for user convenience it is preferable that at least one pedal 18 be on the same side as one of the skids 14. In the example shown in the figures, pallet-dolly 10 has two pedals 18, one on each short side 13 and adjacent to skid 14. While only one pedal 18 is visible in the views of FIGS. 1A and 1B, the opposite side pedal 18 may be seen in the view of FIG. 3B, and the two pedals 18 may be seen together in FIGS. 4A and 4B.

FIGS. 2A and 2B as noted show side views of pallet-dolly 10 in the pallet state. In this state wheels 16 are hidden within skids 14. However, in the figures, wheels 16 in both views have been drawn in dashed line to indicate their position relative to skids 14 and the ground. As indicated, in the pallet state wheels 16 have a fixed clearance or height above the ground which may be designated as the "wheel clearance height", or "WCH". Wheel clearance height is the appropriate or minimum height, distance, or clearance which wheels 16 should be lifted above the ground when device 10 is in the pallet state to ensure that the only ground contact is by skid bottom edge 17. More particularly, when wheels 16 are at WCH above ground, there is substantially no risk that pallet device 10 will roll as it would when in the dolly state.

FIGS. 3A and 3B show side views of pallet-dolly 10 in the dolly state. In this state both wheels 16 and skid bottom edges 17 are visible. As indicated, there is a height, distance, or clearance of skid bottom edges 17 above the ground when device 10 is in the dolly state. This distance may be referred to as the "skid clearance height", or "SCH". Skid clearance height is the appropriate or minimum distance that skid bottom edges 17 should be lifted above ground when device 10 is in the dolly state, to reduce or minimize the risk of obstacles interfering with the rolling movement of the device. For example, if the device is being rolled over an uneven surface or small obstacle, skids 14 should be sufficiently high so that wheels 16 and not skids 14 contact the obstacle.

In general, SCH will be appreciably greater than WCH. The wheels 16 need to be at a minimum height only slightly off the ground to avoid the risk of enabling device 10 to roll, so WCH may be relatively small. Raising WCH above the minimum height does not provide any significant further advantage, since ground clearance has already been achieved. By contrast, skids 14 should be relatively high above the ground, since the higher they are the greater the number of obstacles that may be overcome while the device is being rolled as a dolly. According to some embodiments of the invention, WCH is at least 3 mm, and SCH is in the range of 15 to 30 mm, and preferably in the range of 20 to 27 mm. Other values of WCH and SCH clearly fall within the scope of the present invention.

It is to be appreciated, from review of FIGS. 2 and 3, that when moving from the pallet state to the dolly state, skids 14 need to move a distance of WCH plus SCH, i.e. moving WCH moves the skids so that their contact surfaces reach wheel contact plane 19, and then moving SCH moves the skids into the desired position above the ground. Similarly, when moving from the dolly state to the pallet state, skids 14 move the same total distance of WCH plus SCH. In this case, skids 14 first move SCH to draw even with the wheels in contact with the ground, and then move WCH to ensure that the wheels are lifted away from skid bottom edge 17.

It is also worth noting how the weight or force of deck 12 and any load, if present, are received by the elements in the different states. In the pallet state the weight of the load is entirely on skids 14. In converting from the pallet to the dolly, when the skids move the distance WCH, the load weight is effectively lowered and transferred onto wheels 16. Skids 14 then travel the remaining distance SCH without a load, and the weight in the dolly state is supported by wheels 16. When converting from dolly to pallet, skids 14 descend distance SCH to the ground unloaded. Upon reaching the ground, the skids are biased downwards to provide a braking contact or, if unloaded, complete their motion through distance WCH to reach the locked pallet state.

Turning now to FIGS. 4A and 4B, the elements of a skid displacement mechanism 38, according to a preferred embodiment of the invention, may be viewed. To provide enhanced clarity of detail, FIG. 4B provides an enlarged view of some of the components of skid displacement mechanism 38 shown in FIG. 4A.

Skid displacement mechanism 38 functions to move skids 14 between the skid lowered position and the skid raised position in response to depression of foot pedal 18 and skid 14 by the user. Accordingly, skid displacement mechanism 38 comprises the internal elements or mechanical components of device 10 that are between and connect pedals 18 and skids 14.

As indicated in FIGS. 4A and 4B, the non-limiting exemplary implementation of skid displacement mechanism 38 illustrated here includes at least one, and in this case two, rotatable elements in the form of rotatable T-shaped cross connectors 40. The cross connectors 40 rotate about respective pivot points 42, and have opposing arms 44 on either side of this point. The opposing arms 44 terminate in end points 46 that are in the form of apertures. The cross connectors 40 also have center projections 48 which project outwardly from about a center of the cross connectors, at central pivot point 42. Center projections 48 each terminate in a projection tip 50. The cross connectors 40 are positioned so that their respective center projections 48 face one another. Further, cross connectors 40 rotate together, so that their respective opposing arms 44 are always parallel to one another.

Skid displacement mechanism 38 further includes a biasing element or spring 52 connected between opposing projection tips 50. Except where otherwise indicated, in the embodiment shown in the figures spring 52 is a compression spring, and accordingly will also be designated as "compression spring 52" as appropriate.

Compression spring 52 is hollow, and contains in its core a telescopic rod comprising an inner core 54 and an outer core 56. The telescopic rod functions to provide a solid interior to compression spring 52 so that compression spring 52 does not collapse or bend when compressed. Inner core 54 fits inside outer core 56, and moves out and in to enable the telescopic rod to extend and contract in conjunction with extension and contraction of compression spring 52.

Figure 7A:
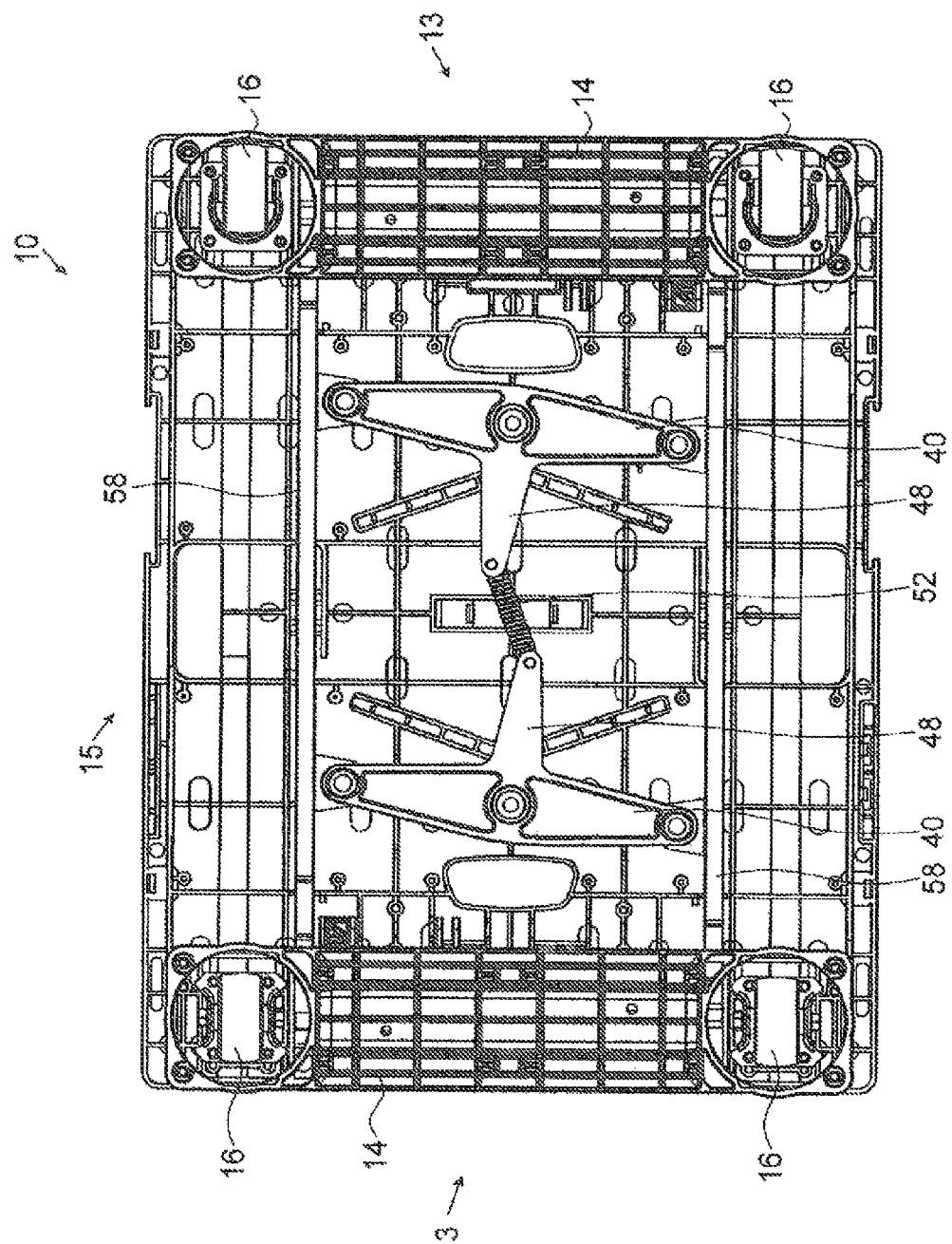
FIGS. 7A and 7B are isometric bottom views of the pallet-dolly of FIG. 1, where the pallet-dolly is configured as a pallet and as a dolly, respectively.
Figure 7B:
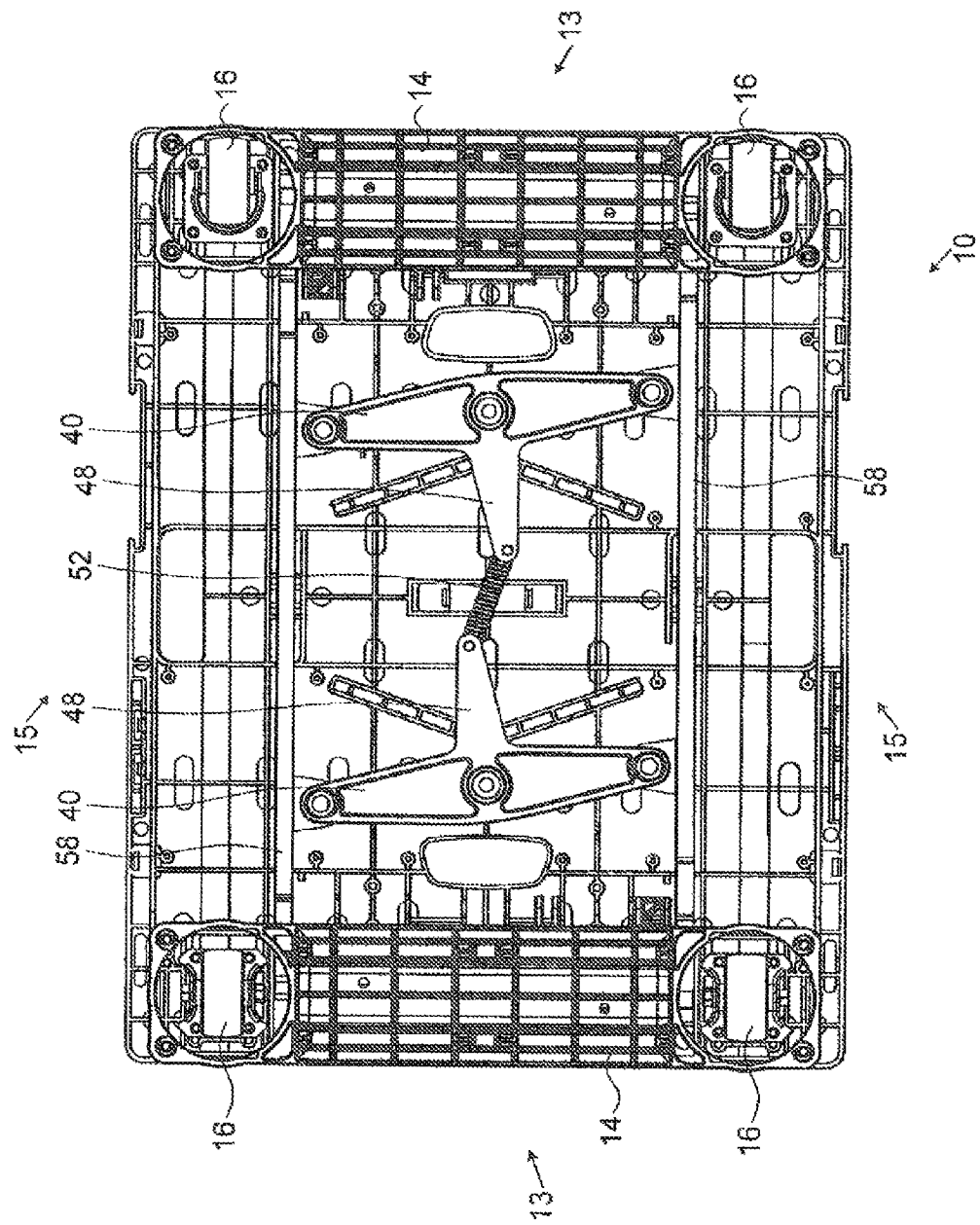

The cross connectors 40 rotate in an arc that is generally less than 90 degrees, and typically less than 30 degrees, and move between two stable positions under the force of compression spring 52. The movement of cross connectors 40 is shown in FIGS. 7A and 7B, which are isometric bottom views of pallet-dolly 10. In FIG. 7A cross connectors 40 are rotated slightly clockwise (when viewed from below), and are in a stable position corresponding to pallet-dolly 10 as a pallet. In FIG. 7B cross connectors 40 are rotated slightly counter-clockwise, and are in a stable position corresponding to pallet-dolly 10 as a dolly. Compression spring 52 pushes on projection tips 50 to provide a force that biases cross connectors 40 into one or other stable position. This force has to be overcome to move cross connectors 40 from one stable position to the other. Since there are two stable positions of cross connectors 40, these elements and more broadly, skid displacement mechanism 38, may be described as being a "bistable mechanism".

Figure 5:
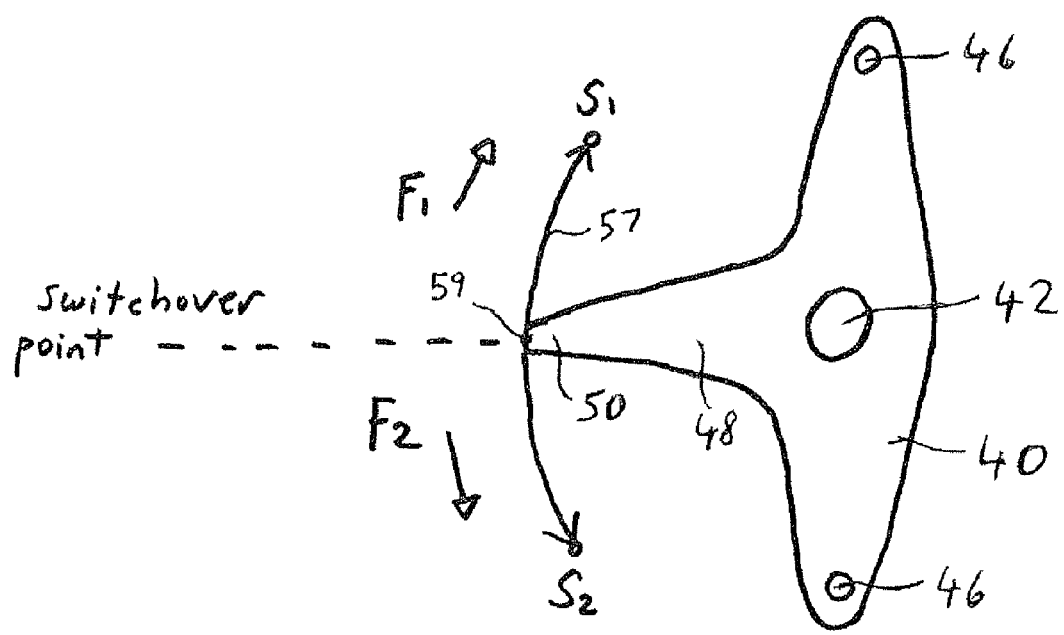
FIG. 5 is a schematic illustration of the operation of a cross connector element of the pallet-dolly shown in FIGS. 4A and 4B.

The arrangement of cross connectors 40 and compression spring 52 to provide a bistable mechanism may be further understood from the sketch of FIG. 5. As shown, cross connector 40 rotates about an arc 57 between two stable positions S1 and S2. At some point or position in the range of arc 57 there is a threshold, crossover, or switchover point or position 59 at which compression spring 52 (or any other biasing arrangement used) has a local maximum of stored potential energy. For further clarity, this crossover point is shown in FIG. 5 as a dashed horizontal line intersecting arc 57 at point 59 on the arc. When cross connector 40 rotates, for example clockwise, so that projection tip 50 is "above" switchover point 59 in the view as illustrated, compression spring 52 acts to provide a force shown as F1 that urges or pushes cross connector 40 to rotate towards stable position S1, or its maximum range in the clockwise direction. Similarly, if cross connector 40 is moved or rotated so that projection tip 50 is "below" switchover point 59 in the view as illustrated, compression spring 52 provides the force F2, which urges or pushes cross connector 40 towards stable position S2, or its maximum range in the counter-clockwise direction.

Figure 6A:
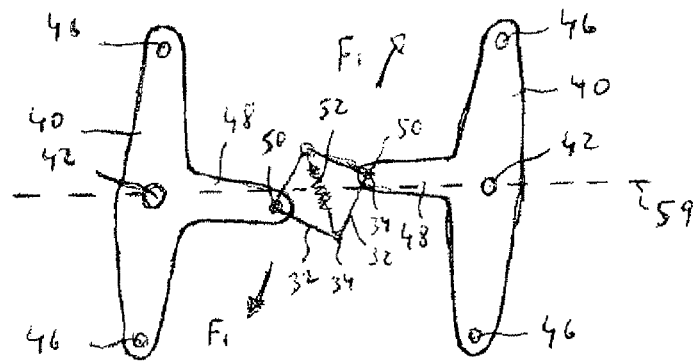
FIGS. 6A, 6B, and 6C are schematic illustrations of the operation of a cross connector element of the pallet-dolly, where bias is applied by a tension spring.
Figure 6B:
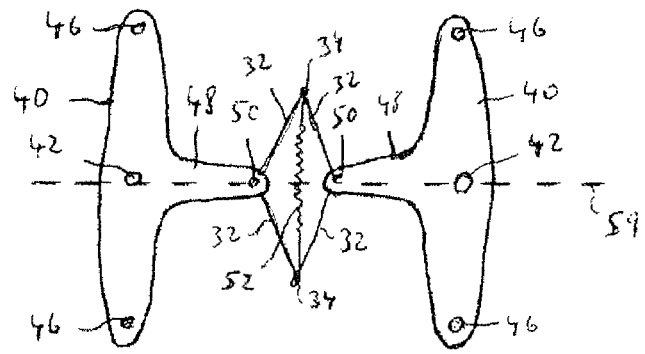
Figure 6C:
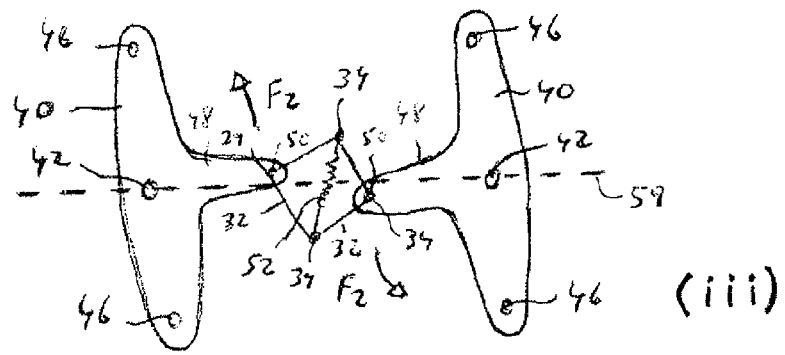

It should be noted that the compression spring arrangement illustrated here is a non-limiting example of many different biasing mechanisms which may be used to provide bistable resilient biasing for implementation of this embodiment of the present invention. FIGS. 6A, 6B, and 6C show one additional non-limiting embodiment of skid displacement mechanism 38, in which spring 52 is a tension spring deployed to generate overall extension of a hinged parallelogram frame, replacing the compression spring of the previous example. For this embodiment, spring 52 may accordingly be designated as "tension spring 52".

In the top drawing of FIG. 6A, the elements are shown in a state of bias where cross connectors 40 apply a force F1 in a first direction corresponding to clockwise rotation. In this view it can be seen that projection tips 50 are on alternate sides of the centerline, or switchover line 59. The bottom drawing of FIG. 6C shows the corresponding opposite bias state where cross connectors 40 rotate counter-clockwise and apply a force F2 in a second direction opposite to the first direction. Projection tips 50 are again on alternate sides of switchover line 59, but opposite to their positions in FIG. 6A. The middle drawing, FIG. 6B, shows the elements in transition from FIG. 6A to FIG. 6C, where projection tips 50 are both located on switchover line 59 and at their closest point to one another.

As indicated, in this embodiment there is a frame formed from a set of four brackets 32 connected to one another at hinges 34 to form a parallelogram configuration, with spring 52 in the middle. Two of the hinges 34 are pivotally connected to the two projection tips 50 of cross connectors 40, with spring 52 attached to the other two hinges 34. Accordingly, in this embodiment spring 52 does not attach directly to projection tips 50 of cross connectors 40, as it did in the embodiment where spring 52 was a compression spring.

The natural bias of tension spring 52 is to contract from an extended or stretched state, in contrast to compression spring 52 whose corresponding tendency is to lengthen or expand from a shortened or contracted state. It may also be said that tension spring 52 is stable when contracted, and compression spring 52 is stable when expanded.

As shown in FIGS. 6A-C, when tension spring 52 contracts the internal angles of the parallelogram become smaller, i.e. approach 90 degrees and the parallelogram approaches a square shape. This has the effect of pushing opposing projection tips 50 further apart, as shown in FIGS. 6A and 6C. By contrast, when tension spring 52 is stretched the internal angles become larger, i.e. approach 180 degrees, so that linked brackets 32 become closer to a straight line and opposing brackets 32 move closer together. Skid displacement mechanism 38 for this embodiment is accordingly configured so that tension spring 52 is in its natural, or more stable, contracted state when in either biased state, as shown in FIGS. 6A and 6C. In order to overcome the force of a biased state and cross over to the other biased state, tension spring 52 is stretched, as shown in FIG. 6B. Upon release of the stretch, tension spring 52 contracts into the opposite biased state.

It is to be appreciated that skid displacement mechanism 38 operates substantially the same for either embodiment, whether spring 52 is a compression spring or a tension spring. Since the compression spring embodiment is simpler, as it does not require the extra components of brackets 32 and hinges 34, it is generally preferred.

In the example of skid displacement mechanism 38 shown in the figures, the two cross connectors 40 are symmetrical in size and shape, and are also positioned symmetrically across from one another. As a result of this arrangement, switchover point 59 is substantially in the middle of arc 57, and the two forces F1 and F2 generated by compression spring 52 are substantially equal as well. According to some embodiments of the invention, cross connectors 40 may be configured to be asymmetrical in size, shape, and/or position, so that the switchover point would not be in the middle of arc 57 and the forces F1 and F2 would not be equal. A configuration of this type may provide some advantages in certain situations, as discussed in greater detail below.

Skid displacement mechanism 38 further includes two sliding actuators 58, with one located on either side of cross connectors 40. The sliding actuators 58 are oriented parallel to one another, and to deck long side 15. Sliding actuators 58 include various apertures and projections, and are accordingly preferably constructed from injection molded plastic.

Sliding actuators 58 are connected to cross connectors 40 through a downwardly projecting link pin 64 which fits inside and forms a pivotal connection with corresponding aperture end point 46 at the end of arm 44 of cross connector 40. The two sliding actuators 58 and two cross connectors 40 thus form a parallelogram frame such that displacement of one sliding actuator 58 results in an equal and opposite displacement of the other sliding actuator 58, and associated pivotal rotation of both cross connectors 40. The angular range of motion of the cross connectors is typically sufficiently small, and/or the linkage between them and the sliding actuators is implemented with sufficient freedom of motion perpendicular to the sliding direction, to allow sliding actuators 58 to move in a longitudinal sliding motion without changing the distance between them.

As best seen in FIG. 4B, sliding actuators 58 are also configured to be movable upon depression of pedals 18. Each pedal 18 rotates about an axis 66 and has an upwardly projecting step 62 to which is attached a horizontally projecting pedal pin 30. The pedal pin 30 is sized and shaped to extend above adjacent sliding actuator 58 and to abut an upwardly projecting step 60 on sliding actuator 58. In this way, depression of pedal 18 causes pedal pin 30 to move back, towards the short side 13 in which the pedal is located. Pedal pin 30 pushes against a surface 61 of actuator upwardly projecting step 60, so that sliding actuator 58 also moves back towards short side 13, or in the direction shown by arrows 84. This motion is mirrored by the other sliding actuator 58, through corresponding motion of cross connectors 40.

It may be noted that, since FIGS. 4A and 4B are exploded views, in the figures pedal pin 30 is shown adjacent to actuator upward projecting step 60 and is not actually shown attached to pedal upwardly projecting step 62.

It is to be appreciated that depression of one pedal 18 does not affect the opposite pedal 18. The other pedal 18 therefore remains horizontal while the pressed pedal 18 becomes inclined. There is also preferably a spring, not shown, which returns the pressed pedal 18 to the horizontal position immediately after being pressed. There is no interference with this movement from upwardly projecting step 60 since pedal pins 30 are deployed to push against one side of step 60 when actuated, but are free to return to their original positions when the pedal is released. A further result of this structure is that pressing any pedal 18 while pallet-dolly 10 is in the dolly state simply rotates pedal 18 about axis 66 but has no other effect.

The two sliding actuators 58 move linearly, in a direction parallel to their length and to long side 15 of deck 12, and also move in a direction opposite to one another. As a result of their linked connection, the linear movement of sliding actuators 58 is always matched by rotational movement of cross connectors 40. Further, the rotational movement; of cross connectors 40 in moving towards a stable position is matched with a corresponding linear movement of sliding actuators 58, either towards or away from short sides 13, as appropriate. Accordingly, sliding actuators 58 may be viewed as an element that functions to translate rotational movement of cross connectors 40 to linear movement.

The sliding actuators 58 are also connected to skids 14. This connection is preferably made by a pin-and-slot arrangement. Specifically, in the example illustrated here, apertures in the form of displacement slots 68 are located on the body of each sliding actuator 58. There are four displacement slots 68, one located at each end of each sliding actuator 58. As shown, displacement slot 68 is a single continuous slot that may be viewed as being composed of a lower slot 70 and an inclined slot 72. For greater clarity, in FIG. 4B two of the four displacement slots 68 are also shown in an enlarged view.

Skid displacement mechanism 38 further includes skid pins 74, which provide the link that connects skids 14 to sliding actuators 58. As shown, there are four skid pins 74. Skids 14 include skid links 76, in the form of apertures, which are each sized and shaped to receive a skid pin 74 fixed therein. Skid links 76 are shown positioned at an upper part of hollow wheel chamber 24, which as noted is attached to or an integral part of skid 14. Skid links 76 may be placed in other positions on skid 14, as appropriate for other embodiments of the invention. Displacement slots 68 are also sized and shaped to receive skid pins 74 in sliding engagement. Accordingly, skids 14 connect or attach to skid displacement mechanism 38 by connecting each skid pin 74 to skid link or aperture 76, and to the associated displacement slot 68. It is to be appreciated that, according to some embodiments, the positions of displacement slots 68 and skid links 76 may be reversed, so that displacement slots 68 are located on the sides of hollow wheel chambers 24 and skid links 76 are located on the bodies of sliding actuators 58.

Displacement slots 68 and skid pins 74 are configured so that skid pins 74 are readily slidable inside displacement slots 68. More particularly, skid pins 74 are movable between three positions in displacement slots 68. These three positions are illustrated in the enlarged views of displacement slots 68. As indicated, there is a first stable position 78, in which skid pin 74 is in lower slot 70, a second stable position 80, in which skid pin 74 is at the top of inclined slot 72, and an interim position 82, in which skid pin 74 is located near the bottom of inclined slot 72, at a position close to but just short of the vertex or intersection point of lower slot 70 and inclined slot 72. When skid pin 74 is in the first stable position 78, skids 14 are in the lowered position and pallet-dolly 10 is a pallet. When skid pin 74 is in the second stable position 80, skids 14 are in the raised position and pallet-dolly 10 is a dolly. When skid pin 74 is in interim position 82, skids 14 are in the lowered position and pallet-dolly 10 is a brake.

FIGS. 7A and 7B show isometric bottom views of skid displacement mechanism 38 that illustrate the position of cross connectors 40 and compression spring 52 for the two stable positions. In FIG. 7A pallet-dolly 10 is a pallet, and skid pins 74 are in first stable position 78 in displacement slot 68. In FIG. 7B pallet-dolly 10 is a dolly, and skid pins 74 are in second stable position 80 in displacement slot 68.

It may be noted that the orientation of the component slots of displacement slot 68 in one sliding actuator 58 is opposite to the orientation of the component slots in displacement slot 68 in the opposing sliding actuator 58, since as noted above the sliding actuators are linked so as to move in opposite directions. For example, where inclined slot 72 in one sliding actuator 58 is sloped upwards to the right, inclined slot 72 in the opposing sliding actuator 58 will be sloped upwards to the left. Opposing lower slots 70 are similarly oriented in opposite directions, i.e. when one points to the right, with reference to its associated inclined slot 72, lower slot 70 in the opposing sliding actuator 58 will point to the left.

The effect of the pin-and-slot engagement is that horizontal sliding motion of sliding actuators 58 is translated into vertical movement of skid pin 74, and hence also of skids 14.

Cross connectors 40, sliding actuators 58, and skid pins 74 moving in displacement slots 68 form an integrated mechanical system in which motion of one element generates motion of the others, as follows. Rotation of cross connectors 40 under the force or urging of compression spring 52 moves sliding actuators 58 linearly in a horizontal plane, which in turn moves skid pins 74 and associated skids 14 vertically. Alternatively, movement of sliding actuators 58, such as for example by depression of pedal 18, will cause corresponding rotational movement of cross connectors 40 and vertical movement of skid pins 74. Lastly, independent movement of skid pins 74 in inclined slot 72, such as occurs when skid 14 is pressed downwards, will cause linear horizontal movement of actuator slots 58 and rotational movement of cross connectors 40. However, due to the horizontal orientation of lower slots 70, skids 14 are locked in the pallet position when fully lowered and when sliding actuators 58 are biased to the corresponding extreme position, requiring positive displacement of sliding actuators 58 by operation of pedal 18 before the skids can be raised.

It is to be appreciated that the range of motion of skids 14 in moving between the skid lowered position and the skid raised position corresponds to the range of motion of the component elements of skid displacement mechanism 38, i.e. the rotational movement of cross connectors 40 between stable positions S1 and S2, the linear movement of sliding actuators 58 between two extreme positions defined by forward and reverse movement along arrows 84, and the vertical movement of skid pins 74 in displacement slot 68.

In the embodiment shown, the range of motion limits are determined by the finite length of inclined slot 72 in displacement slot 68. It is to be appreciated that, according to some embodiments, the range of motion limits may alternatively be set by a physical block to rotation of cross connectors 40 and/or to linear movement of sliding actuators 58. In such embodiments, inclined slot 72 may be relatively longer and even could be open ended. Travel of skid pins 74 in such inclined slots would still be limited to positions 78, 80, and 82, if configured as such by appropriate placement of blocks to movement of cross connectors 40 or sliding actuators 58.

For greater clarity, the two stable positions, shown as S1 and S2 in FIG. 5, refer to states in which skids 14 and associated elements of skid displacement mechanism 38 such as cross connectors 40, sliding actuators 58, and skid pins 74 in displacement slots 68, have reached their appropriate end or terminal points and are stable and stationary, i.e. are not moving. More particularly, the two stable positions of skids 14 are the skid lowered position and the skid raised position.

Skid displacement mechanism 38 may also be described as having two biased states, corresponding to the force or bias provided by compression spring 52 as a result of the positioning of center projections 48 of cross connectors 40 on either side of switchover point 59. On one side of switchover point 59 there is a bias urging skids 14 upwards, towards the stable dolly state, and on the other side of switchover point 59 there is a bias urging skids 14 downwards, towards the stable pallet state. Accordingly, while skid displacement mechanism is in a biased state, it may or may not have reached the corresponding stable state. More particularly, when skid displacement mechanism 38 is in the downward biased state, skids 14 may be in the non-stable brake state or in the stable pallet state.

Further, the bistable feature of skid displacement mechanism 38, according to some embodiments of the invention, relates not only to the presence of two stable positions, but more particularly to the fact that each stable position is produced by an active bias from a single biasing mechanism. This may be contrasted with the structure of other pallet-dollies, in which, for example, one of the pallet or dolly states may be produced by a biasing mechanism, such as a spring, but the other of the pallet or dolly states is the result of a latch holding or locking the skids and other elements in place against the bias of a spring or other biasing mechanism.

It is also to be appreciated that the terms "first" and "second", when used in reference to the two stable positions and their associated biased states, provide a convenient distinction in terminology and do not imply that either position or state occurs before or after the other. Accordingly, either of the two positions and their associated biased states may be referred to as "first", and the other of the two positions and states referred to as "second".

The operation of skid displacement mechanism 38, according to the preferred embodiment of the invention, will now be described.

In an initial position where pallet-dolly 10 is a pallet, skid pins 74 are in lower slot 70 and skids 14 are in the skid lowered position. As shown in the bottom view of FIG. 7A, cross connectors 40 are rotated slightly clockwise, and are pushed under the force of compression spring 52 into first stable position 78. In this fully lowered position of the skids, wheels 16 are raised a distance WCH above the ground, and the full weight of the load is taken by skids 14. Since skid pins 74 are in lower slot 70 which has an upper and lower boundary, the rotational force provided by cross connectors 40 does not need to oppose the load while maintaining this position.

When it is desired to convert pallet-dolly 10 to a dolly, the user presses down on any pedal 18. As noted, depression of pedal 18 moves sliding actuators 58 linearly and in a horizontal plane, towards opposite short sides 13 of deck 12. This direction of movement is shown in FIGS. 4A and 4B by arrows 84 for each sliding actuator 58. Movement of sliding actuators 58 will have two effects.

Firstly, sliding actuators 58 move so that skid pin 74 moves along lower slot 70 until it enters inclined slot 72 and starts to lift skids 14 towards deck 12. The weight of deck 12 and any load that may be on the deck assists with the initial part of the upward movement of skid pin 74 in inclined slot 72, as the load is lowered onto wheels 16.

The movement of sliding actuators 58 also causes cross connectors 40 to rotate, as described above. More particularly, the force of pedal 18 is sufficient to overcome the force of compression spring 52 holding cross connectors 40 in first stable position 78. Cross connectors 40 accordingly rotate past switchover point 59, and as a result come under the influence of compression spring 52 to produce a force in the opposite direction, towards second stable position 80.

Turning back to movement of sliding actuators 58, when sliding actuators 58 move sufficiently to reduce the spacing between the deck and the skids by a distance of WCH, wheels 16 come in contact with the ground and the weight of the load is effectively lowered onto the wheels. Skid pins 74 continue to move upwards in inclined slot 72 under the influence of the force produced by continued depressing of the pedal and/or biasing of cross connectors 40 directed towards second stable position 80. Skid pins 74 then continue to move by the distance SCH, until skid pins 74 reach second stable position 80 at the top of inclined slot 72. Skids 14 rise with skid pins 74, and in this position pallet-dolly 10 is a dolly. Since there is no longer any weight of the load on skids 14 (after initial movement WCH), the force provided by compression spring 52 only has to move skids 14. Compression spring 52 is selected to have sufficient spring force to move skid pins 74 and skids 14, and to hold skid pins 74 in second stable position 80 under normal operating conditions.

When it is desired to convert pallet-dolly 10 from a dolly to a configuration in which the skids are lowered, such as a pallet or a brake, the user presses down on skid 14. This action physically forces skid pins 74 down inclined slot 72 to interim position 82 located slightly above the junction of inclined slot 72 and lower slot 70. More particularly, skid pins 74 and skids 14 are moved the distance of skid clearance height ("SCH") so that skid bottom 17 moves into contact with the ground. The mechanical linkage of both skids to the parallelogram of sliding actuators and cross-connectors ensures that downward force applied to one skid is effective to lower all of the skids simultaneously.

At the same time, the movement of skid pins 74 in inclined slot 72 forces sliding actuators 58 to move linearly, in the opposite direction of that shown by arrows 84 in FIG. 4A. This movement in turn urges cross connectors 40 to rotate away from second stable position 80. This force is sufficiently strong to overcome the existing force of compression spring 52, so that cross connector 40 rotates past the switchover point. As a result, compression spring 52 now provides a force urging cross connectors 40 towards first stable position 78. It is to be appreciated that the bistable skid displacement mechanism 38 is mechanically linked to skids 14 such that switching from both the pallet to the dolly state, and from the dolly state to the pallet state, occurs as skids 14 pass through threshold position or switchover point 59.

What happens next depends upon whether there is a load on deck 12. If there is no load, the force of compression spring 52 is typically sufficiently strong to move cross connectors 40 so that they reach the end of their range of movement, at first stable position 78. This in turn will move sliding actuators 58 to the end of their range of linear movement, and skid pins 74 will reach the bottom of inclined slot 72, and then be urged into lower slot 70. In effect, compression spring 52 will have moved skids 14 the last part of their movement, a distance of wheel clearance height ("WCH"). Wheels 16 will be raised off the ground by the distance WCH, and pallet-dolly 10 will be a pallet.

If however, there is a load on deck 12, compression spring 52 would have to be strong enough to move not only wheels 16 and deck 12 by the distance WCH, but also the load. This is unlikely to be possible in most cases, since compression spring 52 is typically configured to be strong enough to move an unloaded deck but not one with a load. Further, in many practical applications the loads are quite heavy, upwards of several hundred pounds in weight. As a result, cross connectors 40 will provide a force urging sliding actuators 58, which in turn urge skids 14 downward. The force will not be enough to move skids 14 downward the required distance WCH, but will be useful to contribute to the skids function as a brake, restraining rolling movement of wheels 16. Accordingly, in this position wheels 16 and skid bottom edge 17 are both on the ground, and movement of wheels 16 is stopped or reduced by the braking force of skids 14. In this case, the majority of the weight of the load is typically still supported by wheels 16. Optionally, the braking effect can be enhanced by providing a positive locking arrangement for the wheels, operated by motion of the skid, as will be described in greater detail below.

From this position, pallet-dolly 10 can be restored to a dolly by pressing any pedal 18. Otherwise, pallet-dolly 10 will be converted to a pallet upon direct removal of the load from deck 12, or by its functional equivalent of lifting pallet-dolly 10 with a forklift. Upon removal of the load, the force provided by cross connectors 40 no longer has to lift the load, and is now sufficient to move the sliding actuators 58 to the end of their motion and complete lowering of the skids to the pallet state.

In order to enhance the braking effect while in the brake position, skid displacement mechanism 38 may optionally be adapted to provide a relatively stronger downward force on the skids while in the brake position compared with the upward force on the skids in the dolly state. There are a variety of ways that a stronger force may be achieved. One way is to modify the design of cross connectors 40 so that they are asymmetrical in shape and/or position, so that the force in first stable position 78 is stronger than the force in second stable position 80. As noted, in second stable position 80 the force of cross connectors 40 only needs to support the weight of skids 14, which is a predefined known weight. Another approach to increasing the force is to change the angle between lower slot 70 and inclined slot 72 in displacement slot 68. Varying the angle of the slot effectively changes the ratio between horizontal motion of sliding actuator 58 and vertical motion of skid pins 30, so that a shallower slot angle generates a larger vertical braking force.

According to some embodiments of the invention, pallet-dolly 10 may have three or four pedals 18. An embodiment having four pedals 18, one on each side, is shown in FIGS. 8A and 8B for a pallet and dolly configuration, respectively.

Figure 8A:
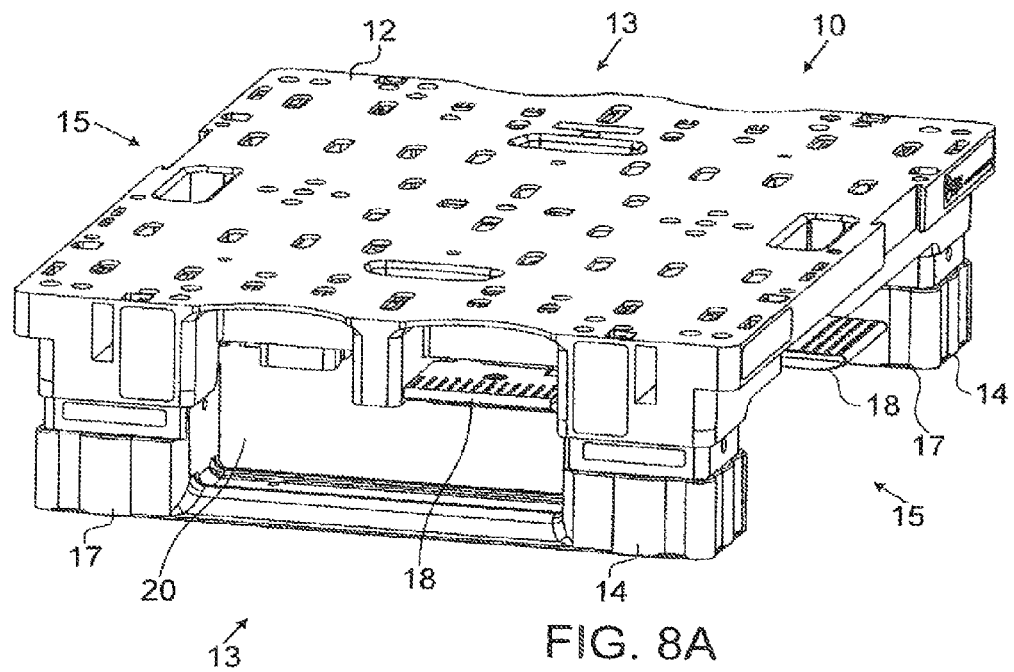
FIGS. 8A and 8B are perspectives view of a pallet-dolly consistent with an embodiment of the present invention, where the pallet-dolly has four pedals and is configured as a pallet and as a dolly, respectively.
Figure 8B:
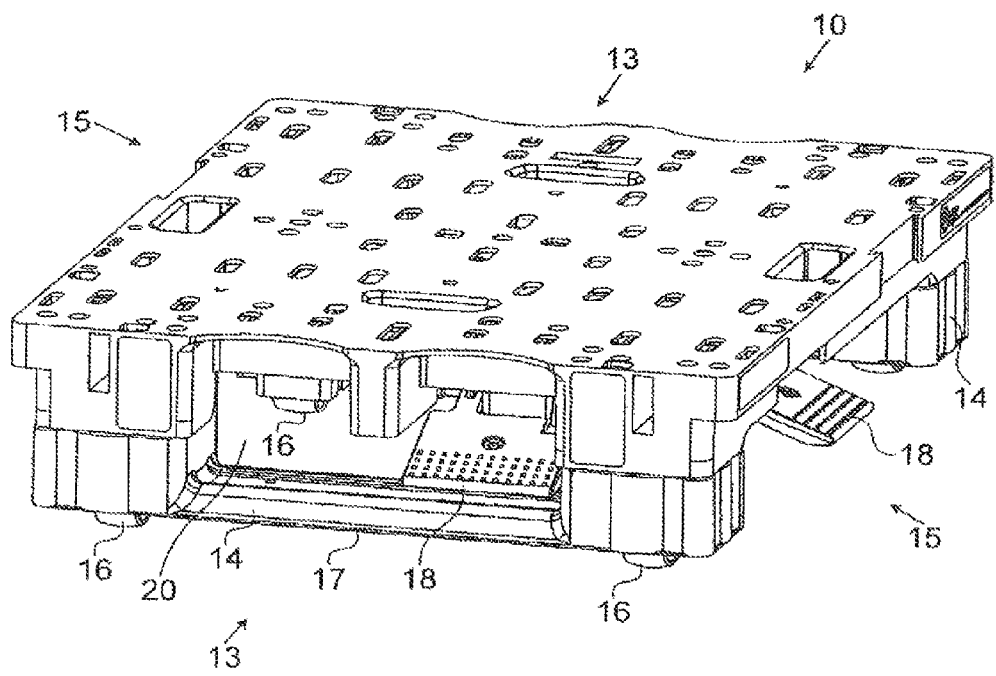

FIG. 9 is a bottom view of the pallet-dolly of FIG. 8A, showing in particular the position of cross connectors 40 and compression spring 52 when in the pallet, or first stable position 78. In this view pedals 18 on long sides 15 may be seen. Also shown in the figure are side pedal rods 35 which connect long-side pedals 18 to cross connectors 40. In particular, side pedal rods 35 attach to projection tips 50 of cross connectors 40. Accordingly, depression of a long-side pedal 18 causes cross connector 40 to rotate in a counter-clockwise direction, when viewed from the perspective of a bottom view. It is to be appreciated that pedals 18 and their linkages to cross connector 40 are configured so that pressing any pedal 18, whether on short side 13 or long side 15 of deck 12, will cause the same direction of rotation of cross connectors 40.

FIGS. 10A and 10B show further detail of the structure of long-side pedals 18. As indicated, each long-side pedal 18 preferably terminates in a linear displacement slot 36. A projecting pin 37 is fixedly attached to projection tip 50, and is slidably connected to linear displacement slot 36. There is also a spring (not shown), which restores long-side pedals 18 to the horizontal position immediately after being pressed.

FIGS. 10A and 10B show the position of the elements when pallet-dolly 10 is a pallet and a dolly, respectively. As indicated in FIG. 10A, in the pallet state projecting pin 37 is positioned at a far end of linear displacement slot 36. Accordingly, when long-side pedal 18 is pressed, side pedal rod 35 moves in the direction shown by arrow 39, and thereby pulls cross connector 40 so that it rotates counter-clockwise. As shown in FIG. 10B, this motion causes projecting pin 37 to move to the opposite or close end of linear displacement slot 36 when pallet-dolly 10 is in the dolly state.

It is to be appreciated that, as a result of this preferred implementation, pressing long-side pedal 18 does not cause movement of the opposing long-side pedal 18. While the opposing cross connector 40 will rotate, that cross connector's associated projecting pin 37 will simply travel within linear displacement slot 36, from the far end to the close end. Accordingly, the opposing pedal's side pedal rod 35 will not be subject to any force and will not move. In addition, pressing long-side pedal 18 while in the dolly state will just move side pedal rod 35 in the direction of arrow 39, or away from projecting pin 37. Since there is no contact with projecting pin 37, pressing pedal 18 has no material effect.

Turning now to a further aspect of the present invention illustrated with reference to FIGS. 11A-11D, certain preferred embodiments of the present invention provide a wheel brake on one or more wheels which is mechanically associated with the skids so as to be disengaged when the skids are fully raised and to be engaged to prevent rotation of the wheel(s) as the skids are lowered. In embodiments of the present invention which provide a braked-dolly state, the locking of the wheel(s) provides enhanced braking beyond the effect of frictional contact between the skids and the ground. However, this feature is not limited to such implementations, and may also be used to advantage in an otherwise conventional dolly-pallet such as that of U.S. Pat. No. 7,537,222 mentioned above. For such embodiments, the wheel brake may be deployed so as to be locked near the beginning of the conversion to a pallet, thereby preventing the dolly from rolling away from the user as the user completes the conversion motion (such as by further pressing on a pedal).

Turning now to details of an exemplary embodiment of this aspect of the invention, a wheel brake mechanism 86 that acts to apply a braking force directly to a wheel 16 of pallet-dolly 10, according to some embodiments, is shown in FIGS. 11A to 11D. Wheel brake mechanism 86 is shown here in use with fixed orientation wheels 16, and accordingly is typically installed in the two wheels having that configuration in many embodiments of pallet-dolly 10. A slight variant of this structure could readily be implemented additionally, or alternatively, with the cantered wheels.

Figure 11A:
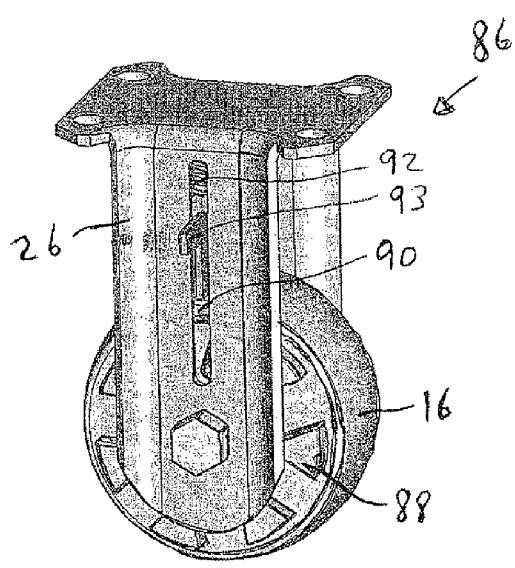
FIG. 11A is a perspective view of a wheel, wheel frame, and skid actuated wheel brake, consistent with an embodiment of the present invention.

FIG. 11A shows a perspective view of a wheel 16 in fixed wheel frame 26 with wheel brake mechanism 86 installed. It can be seen that wheel 16 and wheel frame 26 are modified in order to accommodate wheel brake mechanism 86. Specifically, wheel 16 is adapted so that on one side of the wheel there is an engagement surface 88, and wheel frame 26 is adapted to include a substantially vertical opening or slot 90 in the body of the wheel frame. In this view wheel brake mechanism 86 is partly hidden by fixed wheel frame 26. However, a spring 92 and a projecting portion 93 of a brake pin 94 can be seen through opening 90 in wheel frame 26.

Figure 11B:
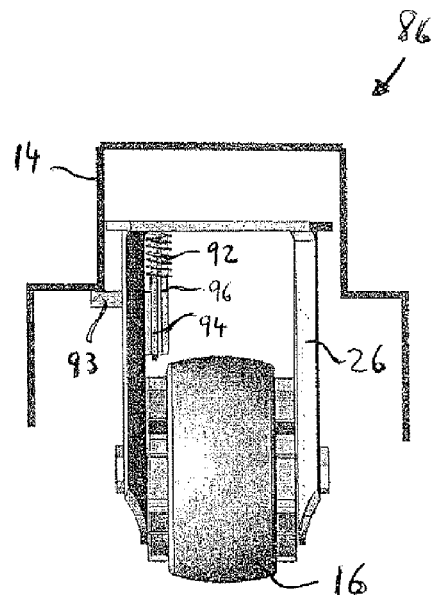
FIG. 11B is a front view of the wheel elements of FIG. 11A, showing a skid pushing a brake pin of the wheel brake.

The elements of wheel brake mechanism 86 may be seen more clearly in the front view of FIG. 11B. As indicated there is a frame pin 96 which is fixedly attached to an underside of the top of wheel frame 26. Spring 92 fits over frame pin 96. An upper end of spring 92 is fixedly attached to an upper part of frame pin 96, substantially near the top of frame pin 96. A lower end of spring 92 is free to move vertically. In a first implementation option illustrated in FIG. 11B, spring 92 is a tension spring biasing pin 96 to a raised, disengaged state, and which is displaced by downward movement of the skid towards its engaged, locking state. As will be discussed below, in an alternative implementation, spring 92 may be a compression spring biasing pin 96 to its engaged, locking state, and may be raised to its disengaged state by movement of the skid. More complex mechanisms mechanically associating motion of the skid with motion of the brake pin, whether directly or indirectly, also fall within the scope of the present invention.

As may also be seen in FIG. 11B, brake pin 94 has a vertical portion that positively engages with wheel engagement surface 88, and a horizontal portion, in this case projecting portion 93, that projects through slot 90 to provide a surface for contact with downwardly moving skid 14. This may be seen in FIG. 11B, which shows an outline of skid 14 in contact with projecting portion 93 of brake pin 94. Brake pin 94 is fixedly attached to the free end of spring 92, so that brake pin 94 descends when spring 92 is stretched, and rises when spring 92 snaps back, or returns to its compact state. Accordingly and as may be seen in FIG. 11B, downward movement of skid 14 will provide a downward contact force on projecting portion 93, which will pull brake pin 94 down and stretch spring 92. Upon skid 14 moving upward and away from contact with projecting portion 93, spring 92 will contract and pull brake pin 94 upward.

Figure 11C:
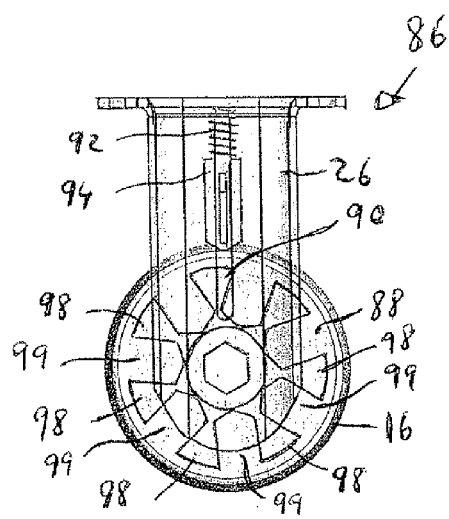
FIG. 11C is a side view of the wheel elements of FIG. 11A, showing a transparent wheel frame and the brake pin in an elevated or unlocked position.
Figure 11D:
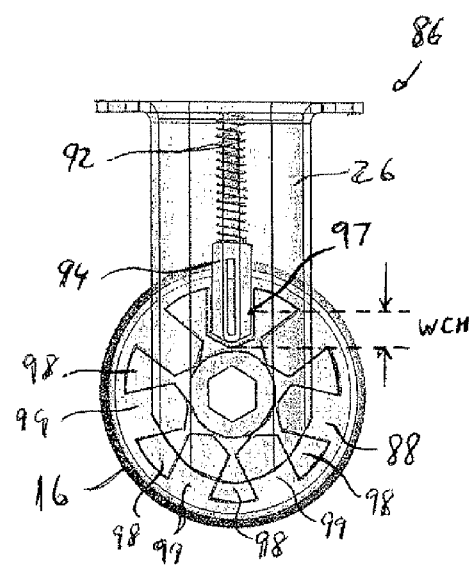
FIG. 11D is the same side view as FIG. 11C, showing the brake pin in a descended or locked position.

FIGS. 11C and 11D are side views of wheel 16, in which wheel frame 26 is made transparent to better illustrate the operation of wheel brake mechanism 86. In this view it can be seen that wheel engagement surface 88 is a series of radially oriented projections 98 and associated grooves 99, positioned between adjacent projections 98. The grooves 99 are sized and shaped to form a slidable and close fit with the vertical portion of brake pin 94. More particularly, when brake pin 94 enters or slides into any groove 99 of wheel 16, wheel 16 is prevented from turning and is accordingly braked by brake pin 94. The interaction of brake pin 94 with groove 99 may be described as a tongue and groove connection, with the vertical portion of brake pin 94 being sized and shaped as a tongue.

The operation of wheel brake mechanism 86 to apply an independent brake to pallet-dolly 10 may be seen in FIGS. 11C and 11D. In FIG. 11C brake pin 94 is elevated or raised so that it is clear or above wheel 16, and wheel 16 is free to rotate. This is a raised or unlocked position of wheel brake mechanism 86, and is the state when pallet-dolly 10 is a dolly. As shown in FIG. 11D, when a user presses skid 14 to move skid 14 the distance SCH so that skid bottom edge 17 is level with wheel contact plane 19, skid 14 presses brake pin 94 so that the vertical portion of brake pin 94 enters groove 99. As long as skid 14 is in this lower position, brake pin 94 is in groove 99 and wheel 16 is prevented from rolling. This is the lowered or locked position of wheel brake mechanism 86. As noted, this braking force acts to supplement the frictional, downward braking force of skid 14 when in the brake position, which will be the case, for example, when there is a load on deck 12.

As noted above, when moving from the dolly state to the brake state, skids 14 move the distance SCH, at which point skid bottom edges 17 are level with wheel contact plane 19. Subsequently, when moving from the brake state to the pallet state, the wheels are lifted the distance WCH. Alternatively, this is equivalent to the skids moving by the distance WCH relative to the wheels. Accordingly, when the device is in the brake state, brake pin 94 descends into groove 99 but does not reach the bottom of the groove. Rather, as shown in FIG. 11D, brake pin 94 reaches an intermediate point 97 located at least WCH in distance from the bottom of groove 99. Subsequently, when device 10 is moved into the pallet position, brake pin 94 moves down a further distance WCH within groove 99.

It is to be appreciated that the locking effect of brake pin 94 in groove 99 is substantially the same for any position in which any part of the vertical portion of brake pin 94 enters groove 99. Also, while grooves 99 and brake pin 94 may be sized and shaped so that brake pin 94 reaches the very bottom of groove 99 when device 10 is in the pallet position, as shown in FIG. 11D, for example, other configurations in which brake pin 94 is somewhere above the bottom of groove 99 when device 10 is in the pallet position are also comprehended by the present invention.

According to some embodiments of the invention, wheel brake mechanism 86 may also be configured in a reverse manner from the configuration described above. More particularly, spring 92 may be configured to push brake pin 94 down, into locking engagement with wheel 16, when spring 92 is in its stable or compact position. In this configuration, skid 14 may be structured to have a step or undercut that catches brake pin 94 and pulls brake pin 94 upwards. In this way, the lock on wheel 16 is released, enabling wheel 16 to roll, when skid 14 moves into the raised position corresponding to the dolly state of pallet-dolly 10. Further, according to some embodiments of the invention, wheel brake mechanism 86 may be configured so that the tongue and groove connection comprises a series of radially displaced tongues on wheel engagement surface 88 that interact with a groove on the vertical portion of brake pin 94.

The positive engagement of brake pin 94 with wheel engagement surface 88 in this embodiment may be described as an interlocking type of engagement, since brake pin interlocks with the surface of wheel 16 to prevent rotation of the wheel. "Preventing rotation" in this context refers to prevention of continuous rolling rotation, but may allow for some degree of angular free motion less than a complete revolution. Other types of positive engagement or frictional braking contact methods are also comprehended by the present invention. For example, the engagement may be by friction, as could be obtained by making wheel engagement surface 88 and the vertical portion of brake pin 94 in whole or in part from high friction surfaces configured to produce a resistive, frictional force when pressed into close contact with one another.

The present invention has been described above with reference to a particularly preferred embodiment including a bistable biasing mechanism to offer a particularly preferred combination of features. It should be appreciated, however, that various advantageous features described herein may also be implemented in alternative embodiments which employ biasing of the skid motion in a single direction, in combination with a suitable retaining mechanism for maintaining a skid position against the bias.

For example, the functionality of converting a dolly to a pallet (or braked dolly state) by directly pressing downwards on the skid may be implemented in a range of embodiments of the device in which the raised skid position is maintained by an upwardly biased state of the skid displacement mechanism. As an alternative to the bistable mechanism described above, another embodiment uses a ratchet mechanism or latch (not shown) or other retaining mechanism to retain the skids in their lowered position against an upward bias, thereby selectively maintaining a braked-dolly or pallet state. The ratchet or latch is then released, manually or by a suitable pedal operated mechanism (not shown), when it is desired to convert the device to a dolly.

Similarly, a skid-brake function may be provided in a range of embodiments of a dolly-pallet device in which the skids are biased, at least in the lower part of their motion, towards the lowered pallet state. As an alternative to the bistable mechanism described above, another embodiment employs a downward biasing mechanism which acts downwards on the skid throughout its range of motion. As a result, when a load is supported on the deck and the skid ground contacting surface 17 is brought level with the wheel contact plane 19, the second state generates a downward contact force of the skid ground contracting surface 17 against an underlying surface, such as a floor. In this way, the device would act as a brake. In such an embodiment, a pedal-activated mechanism acts against the spring bias to raise the skids to the raised dolly position when required, and the skids are retained in that position by a latch or any other suitable retaining mechanism.

These alternative embodiments will not be described here in detail, but are readily implemented as modifications of the primary embodiments described above in detail, as will be clear to one ordinarily skilled in the art. For example, a unidirectional biasing mechanism may be implemented simply by suitable deployment of helical extension springs between anchoring points on sliding actuators 58 and appropriately positioned complementary anchoring points at fixed locations relative to the deck.

Pallet-dolly 10, according to some embodiments of the invention, typically provides one or more of the following benefits to users of convertible movable platforms.

In addition to the configurations of a pallet and a dolly, certain preferred embodiments of pallet-dolly 10 provide a brake configuration in which both the wheels and the skids are on the ground, where the skids act as a brake to prevent movement. This may be advantageous in situations where the device is being used as a dolly and is to be immobilized at a point of sale, or moved among multiple stations for partial unloading of goods at each station. Full conversion of the dolly to a pallet at each station would require raising the load on the deck in order to achieve clearance of the wheels from the ground, and may not be feasible or convenient. By contrast, the brake configuration available in pallet-dolly 10 of the present invention is easy and simple to achieve. Accordingly, pallet-dolly 10 may provide benefits of operator convenience and safety in comparison with existing pallet-dollies.

Further, in certain preferred embodiments, the automatic conversion of pallet-dolly 10 from a brake to a pallet upon being lifted by a forklift provides an important safety feature. For example, in situations where device 10 is being lifted in order to be placed on a conveyor belt, it is dangerous for the wheels of the device to have any contact with the underlying moving surface. On a regular, smooth conveyor belt the loaded pallet-dolly could roll off, and on a roll conveyor the device wheels could become stuck between the rollers, leading to a costly shutdown or damage to the conveyor.

With respect to mechanical operation of the skid displacement mechanism, certain preferred embodiments of pallet-dolly 10 are advantageously designed to use the skid as a pedal. This renders operation of the conversion mechanism particularly simple and intuitive, and reduces complexity and production costs of the device.

Another benefit of using the skid as a pedal is that it avoids any problem caused by an arcuate or sideways force that can sometimes occur when pressing on a pedal. Sideways force is not a problem in a pallet state because skids cannot roll. However, a sideways force caused by pressing a pedal through an arcuate path may pose a problem in a dolly state, since the sideways component of the applied force may result in inadvertent motion of the loaded dolly. The pallet skids of the present invention are preferably movable strictly in a vertical plane, and therefore tend not to generate sideways force when depressed.

Yet another benefit is that from the user's point of view, pallet-dolly 10 is simple and easy to use. All that is required is a single depression or press of the user's foot on either a pedal or a skid to convert from a pallet to a dolly, and from a dolly to a brake or pallet. Neither external tools, such as a hammer, or multiple movements, such as might be required to rotate a shaft multiple times, are needed.

It may also be noted that when in the pallet state, the skids are in the lowered position on the ground and clearly cannot be depressed, while the pedals are in a horizontal position ready to be depressed. Conversely, when in the dolly state, depression of the raised skids is intuitively related to conversion to a pallet state. Accordingly, operation of pallet-dolly 10 is highly intuitive and easy to learn.

Further, since pallet-dolly 10 maintains the wheels at a fixed height and displaces the skids, the weight of a load not only does not hinder or oppose the conversion of the device from a pallet to a dolly, but actually assists in the conversion.

Although selected embodiment(s) of the present invention has/have been shown and described, it is to be understood that the present invention is not limited to the described embodiment(s). Instead, it is to be appreciated that changes may be made to this/these embodiment(s) without departing from the principles and spirit of the invention, the scope of which is defined by the claims and the equivalents thereof.

The invention claimed is:

1. A pallet-dolly device convertible between a pallet and a dolly, the device comprising:
a deck having a load supporting surface;
a set of dolly wheels, attached at a fixed height below an underside of the deck so as to define a wheel contact plane;
a set of movable pallet skids, each pallet skid having a ground contacting surface; and
a bi-stable skid displacement mechanism mechanically interlinking the deck and the pallet skids,
said bi-stable skid displacement mechanism being configured to assume a first state biasing the pallet skids upwards towards a skid raised position in which the skid ground contacting surface is raised above the wheel contact plane to provide a dolly state of the pallet-dolly device, and
said bi-stable skid displacement mechanism being further configured to assume a second state in which said bi-stable skid displacement mechanism biases the pallet skids downwards towards a skid lowered position in which the skid ground contacting surface is lowered below the wheel contact plane to provide a pallet state of the pallet-dolly device, and wherein downward force applied directly to one of the pallet skids is effective to switch said bi-stable skid displacement mechanism from said first state to said second state.

2. The pallet-dolly device according to claim 1, further comprising at least one pedal mechanically linked to the bi-stable skid displacement mechanism in such a manner that downward force applied to said pedal switches said bi-stable skid displacement mechanism from said second state to said first state.

3. The pallet-dolly device according to claim 1, wherein said bi-stable skid displacement mechanism is mechanically linked to said pallet skids such that switching between said first and second states occurs as said pallet skids pass through a threshold position.

4. The pallet-dolly device according to claim 1, wherein the bi-stable skid displacement mechanism is configured such that when the mechanism is switched from the first state to the second state while a load is supported on said deck,
said skid ground contacting surface descends to be level with said wheel contact plane, and
said second state generates a downward contact force of said skid ground contacting surface against an underlying surface, thereby acting as a brake.

5. The pallet-dolly device according to claim 4, wherein the bi-stable skid displacement mechanism is configured such that when the load is taken off the wheels,
said downward contact force of said second state moves said pallet skids to the skid lowered position wherein the pallet-dolly device is in the pallet state.

6. The pallet-dolly device according to claim 1, wherein the bi-stable skid displacement mechanism is configured such that the downward bias applied to the skids in the second state when said ground contacting surface is level with said wheel contact plane is greater than the upward bias applied to the skids in the first state.

7. The pallet-dolly device according to claim 1, wherein the bi-stable skid displacement mechanism includes a biasing element configured to provide the downward bias to the skids in the second state and the upward bias to the skids in the first state.

8. The pallet-dolly device according to claim 7, wherein the biasing element comprises a spring attached to opposing rotating elements in such a manner that a bias is applied to the rotating elements urging the rotating elements to rotate in one of a first and a second direction.

9. The pallet-dolly device according to claim 1, wherein the bi-stable skid displacement mechanism includes at least one rotating element urged towards a terminal point of an arc of rotation of the rotating element.

10. The pallet-dolly device according to claim 9,
wherein each rotating element is urged towards a terminal point of an arc of rotation of the rotating element, and
wherein the arc of rotation of each rotating element contains a threshold position, and wherein rotation of each rotating element from one side of the threshold position to the other side of the threshold position changes the bias applied by the spring from a bias to rotate in one of the first and second directions to a bias to rotate in the other of the first and second directions.

11. The pallet-dolly device according to claim 10, further including a pair of sliding actuators mechanically linked to the rotating elements, such that rotation of the rotating elements causes linear movement of the sliding actuators.

12. The pallet-dolly device according to claim 11, wherein the bi-stable displacement mechanism is configured so that each sliding actuator moves the same distance and in an opposite direction from the other sliding actuator.

13. The pallet-dolly device according to claim 1, wherein the bi-stable displacement mechanism includes at least one sliding actuator displaceable parallel to said deck, and at least two vertical actuators deployed to translate linear movement of said sliding actuator into vertical movement of the skids.

14. The pallet-dolly device according to claim 13, wherein the vertical actuators comprise a set of pins slidable within a corresponding set of inclined displacement slots,
wherein the pins are fixedly attached to one of the group consisting of the pallet skids and the at least one sliding actuator, and the displacement slots are integrated with the other one of the group consisting of the pallet skids and the at least one sliding actuator.

15. The pallet-dolly device according to claim 14, wherein each displacement slot contains an inclined slot having an upper end and a lower end, and a pallet position slot horizontally oriented and connected to one of said ends of the inclined slot.

16. The pallet-dolly device according to claim 1, further comprising at least one wheel brake engageable with an associated wheel of the set of dolly wheels, said wheel brake being configured to assume a released state in which the wheel is free to turn and an engaged state in which said wheel brake prevents rotation of the wheel,
wherein said wheel brake is mechanically associated with a corresponding one of said pallet skids such that displacement of the pallet skids downwards results in transfer of said wheel brake from said released state to said engaged state so as to prevent rotation of the associated wheel.

17. A pallet-dolly device convertible between a pallet and a dolly, the device comprising:
a deck having a load supporting surface;
a set of dolly wheels, attached at a fixed height below an underside of the deck so as to define a wheel contact plane;
a set of movable pallet skids, each pallet skid having a ground contacting surface; and
a skid displacement mechanism mechanically interlinking the deck and the pallet skids,
said skid displacement mechanism being configured to assume a first state biasing the pallet skids upwards towards a skid raised position in which the skid ground contacting surface is raised above the wheel contact plane to provide a dolly state of the pallet-dolly device,
and wherein downward force applied directly to one of the pallet skids is effective to displace the pallet skids downwards towards a skid lowered position in which the skid ground contacting surface is lowered below the wheel contact plane to provide a pallet state of the pallet-dolly device.

18. The pallet-dolly device according to claim 17, wherein said skid displacement mechanism is a bi-stable mechanism configured to assume a second state in which said skid displacement mechanism biases said pallet skids downwards towards said skid lowered position.

19. The pallet-dolly device according to claim 18, wherein the skid displacement mechanism is further configured such that, when a load is supported on said deck and said ground contacting surface is brought level with said wheel contact plane, said second state generates a downward contact force of said ground contacting surfaces against an underlying surface, thereby acting as a brake.

20. The pallet-dolly device according to claim 17, further comprising at least one wheel brake engageable with an associated wheel of the set of dolly wheels, said wheel brake being configured to assume a released state in which the wheel is free to turn and an engaged state in which said wheel brake prevents rotation of the wheel, wherein said wheel brake is mechanically associated with a corresponding one of said pallet skids such that displacement of the pallet skids downwards results in transfer of said wheel brake from said released state to said engaged state so as to prevent rotation of the associated wheel.

21. A pallet-dolly device convertible between a pallet and a dolly, the device comprising:

a deck having a load supporting surface;

a set of dolly wheels, attached at a fixed height below an underside of the deck so as to define a wheel contact plane;

a set of movable pallet skids, each pallet skid having a ground contacting surface; and a skid displacement mechanism mechanically interlinking the deck and the pallet skids, said skid displacement mechanism being configured to assume a first state in which the pallet skids are retained in a skid raised position in which the skid ground contacting surface is raised above the wheel contact plane to provide a dolly state of the pallet-dolly device, said skid displacement mechanism being further configured to assume a second state in which said skid displacement mechanism biases the pallet skids downwards towards a skid lowered position in which the ground contacting surface is lowered below the wheel contact plane to provide a pallet state of the pallet-dolly device, wherein the skid displacement mechanism is further configured such that, when a load is supported on said deck and said ground contacting surface is brought level with said wheel contact plane, said second state generates a downward contact force of said ground contacting surfaces against an underlying surface, thereby acting as a brake, wherein said skid displacement mechanism is a bi-stable mechanism configured such that, in said first state, said skid displacement mechanism biases said pallet skids upwards towards said skid raised position, and wherein a downward force applied directly to one of the pallet skids while in said skid raised position is effective to displace the pallet skids downwards towards said skid lowered position.

22. The pallet-dolly device according to claim 21, further comprising at least one wheel brake engageable with an associated wheel of the set of dolly wheels, said wheel brake being configured to assume a released state in which the wheel is free to turn and an engaged state in which said wheel brake prevents rotation of the wheel, wherein said wheel brake is mechanically associated with a corresponding one of said pallet skids such that displacement of the pallet skids downwards results in transfer of said wheel brake from said released state to said engaged state so as to prevent rotation of the associated wheel.

23. A method of moving a load of goods using a pallet-dolly device, the method comprising:

providing the pallet-dolly device of claim 17, configuring the pallet-dolly device as a pallet;

loading the goods onto a deck of the pallet-dolly device;

transporting the loaded pallet-dolly device from a source location to a target location;

pressing a pedal on the pallet-dolly device to convert the pallet-dolly device to a dolly at the target location;

unloading the goods from the pallet-dolly device at the target location; and pressing a skid on the pallet-dolly device to convert the pallet-dolly device to a state selected from the group consisting of a pallet; and a braked dolly in which the skid is biased downwards against an underlying surface to act as a brake.

24. A pallet-dolly device convertible between a pallet and a dolly, the device comprising:

a deck having a load supporting surface;

a set of dolly wheels, attached at a fixed height below an underside of the deck so as to define a wheel contact plane;

a set of movable pallet skids, each pallet skid having a ground contacting surface, the pallet skids between displaceable between a skid raised position in which the skid ground contacting surface is raised above the wheel contact plane to provide a dolly state of the pallet-dolly device and a skid lowered position in which the skid ground contacting surface is lowered below the wheel contact plane to provide a pallet state of the pallet-dolly device; and at least one wheel brake engageable with an associated wheel of the set of dolly wheels, said wheel brake being configured to assume a released state in which the wheel is free to turn and an engaged state in which said wheel brake prevents rotation of the wheel, wherein said wheel brake is mechanically associated with a corresponding one of said pallet skids such that displacement of the pallet skids downwards results in transfer of said wheel brake from said released state to said engaged state so as to prevent rotation of the associated wheel.

25. The pallet-dolly device according to claim 24, wherein the wheel brake comprises a brake pin selectively deployable between a disengaged state corresponding to the released state of the wheel brake and a positively engaged state in which said brake pin engages a corresponding recess formed on an engagement surface of the wheel to define the engaged state of the wheel brake.

26. The pallet-dolly device according to claim 25, wherein said brake pin is resiliently biased to said disengaged state, and wherein said wheel brake is mechanically associated with said pallet skid such that downward displacement of said pallet skid displaces said brake pin towards said positively engaged state.

27. The pallet-dolly device according to claim 25, wherein said brake pin is resiliently biased to said positively engaged state, and wherein said wheel brake is mechanically associated with said pallet skid such that upward displacement of said pallet skid displaces said brake pin towards said disengaged state.

* * * * *